US012802392B2

(12) United States Patent
Balasubramanian et al.

(10) Patent No.: US 12,802,392 B2
(45) Date of Patent: Nov. 17, 2026

(54) METHOD AND APPARATUS FOR VISUAL-FEATURE-DESCRIPTOR NORMALIZATION FOR COOPERATIVE SENSING

(71) Applicant: QUALCOMM Incorporated, San Diego, CA (US)

(72) Inventors: Anantharaman Balasubramanian, San Diego, CA (US); Stelios Stefanatos, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 18/521,765

(22) Filed: Nov. 28, 2023

(65) Prior Publication Data

US 2025/0173997 A1 May 29, 2025

(51) Int. Cl.
*G06V 10/44* (2022.01)

(52) U.S. Cl.
CPC .................................... *G06V 10/44* (2022.01)

(58) Field of Classification Search
None
See application file for complete search history.

(56) References Cited

U.S. PATENT DOCUMENTS

| | | | | |
|---|---|---|---|---|
| 9,965,861 | B2 * | 5/2018 | Wu | G06V 10/757 |
| 11,830,253 | B2 * | 11/2023 | Tang | G05D 1/0221 |
| 12,033,081 | B2 * | 7/2024 | Sarlin | G06N 3/084 |
| 2015/0127648 | A1 * | 5/2015 | Perez | G06F 16/56 707/742 |
| 2019/0138786 | A1 * | 5/2019 | Trenholm | G06F 18/241 |
| 2021/0150252 | A1 * | 5/2021 | Sarlin | G06N 3/084 |
| 2021/0319236 | A1 * | 10/2021 | Tang | G05D 1/0221 |

* cited by examiner

*Primary Examiner* — Tahmina N Ansari
(74) *Attorney, Agent, or Firm* — Polsinelli LLP/QUALCOMM Incorporated

(57) ABSTRACT

Systems and techniques are described herein for matching keypoints between images. For instance, a method for matching keypoints between images is provided. The method may include receiving first descriptors of first keypoints of a first image; transforming the first descriptors to obtain transformed first descriptors; and determining second keypoints of a second image based on the transformed first descriptors, wherein the second keypoints match the first keypoints.

28 Claims, 17 Drawing Sheets

METHOD AND APPARATUS FOR VISUAL-FEATURE-DESCRIPTOR NORMALIZATION FOR COOPERATIVE SENSING

TECHNICAL FIELD

The present disclosure generally relates to visual-feature normalization and sharing of image data and techniques for minimizing communications overhead. For example, aspects of the present disclosure include systems and techniques for normalizing visual features and for sharing image data, for example, for location determination.

BACKGROUND

Cameras are common and reliable sensors available in various types of devices. For example, cameras can be used by such devices for real-time environment awareness. One limitation of device-mounted sensors (including cameras) is that such sensors may be positioned such that a field of view of the sensors is limited and susceptible to occlusions. Sharing and matching of points of interest viewed from different cameras observing a same scene is one approach towards determining locations of devices including the different cameras (e.g., vehicles including cameras).

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for matching keypoints between images. According to at least one example, a method is provided for matching keypoints between images. The method includes: receiving first descriptors of first keypoints of a first image; transforming the first descriptors to obtain transformed first descriptors; and determining second keypoints of a second image based on the transformed first descriptors, wherein the second keypoints match the first keypoints.

In another example, an apparatus for matching keypoints between images is provided that includes at least one memory and at least one processor (e.g., configured in circuitry) coupled to the at least one memory. The at least one processor configured to: receive first descriptors of first keypoints of a first image; transform the first descriptors to obtain transformed first descriptors; and determine second keypoints of a second image based on the transformed first descriptors, wherein the second keypoints match the first keypoints.

In another example, a non-transitory computer-readable medium is provided that has stored thereon instructions that, when executed by one or more processors, cause the one or more processors to: receive first descriptors of first keypoints of a first image; transform the first descriptors to obtain transformed first descriptors; and determine second keypoints of a second image based on the transformed first descriptors, wherein the second keypoints match the first keypoints.

In another example, an apparatus for matching keypoints between images is provided. The apparatus includes: means for receiving first descriptors of first keypoints of a first image; means for transforming the first descriptors to obtain transformed first descriptors; and means for determining second keypoints of a second image based on the transformed first descriptors, wherein the second keypoints match the first keypoints.

Systems and techniques are described for sharing image data for matching of keypoints between images. According to at least one example, a method is provided for sharing image data for matching of keypoints between images. The method includes: obtaining a first image of a scene captured from a first viewing angle; generating first descriptors of first keypoints of the first image; transforming the first descriptors to obtain transformed first descriptors based on a second viewing angle of the scene; and transmitting the transformed first descriptors.

In another example, an apparatus for sharing image data for matching of keypoints between images is provided that includes at least one memory and at least one processor (e.g., configured in circuitry) coupled to the at least one memory. The at least one processor configured to: obtain a first image of a scene captured from a first viewing angle; generate first descriptors of first keypoints of the first image; transform the first descriptors to obtain transformed first descriptors based on a second viewing angle of the scene; and transmit the transformed first descriptors.

In another example, a non-transitory computer-readable medium is provided that has stored thereon instructions that, when executed by one or more processors, cause the one or more processors to: obtain a first image of a scene captured from a first viewing angle; generate first descriptors of first keypoints of the first image; transform the first descriptors to obtain transformed first descriptors based on a second viewing angle of the scene; and transmit the transformed first descriptors.

In another example, an apparatus for sharing image data for matching of keypoints between images is provided. The apparatus includes: means for obtaining a first image of a scene captured from a first viewing angle; means for generating first descriptors of first keypoints of the first image; means for transforming the first descriptors to obtain transformed first descriptors based on a second viewing angle of the scene; and means for transmitting the transformed first descriptors.

Systems and techniques are described for matching keypoints between images. According to at least one example, a method is provided for matching keypoints between images. The method includes: receiving transformed first descriptors of first keypoints of a first image, the first image captured from a first viewing angle, the transformed first descriptors related to a second viewing angle; obtaining a second image captured from the second viewing angle; and determining second keypoints of the second image based on the transformed first descriptors, wherein the second keypoints match the first keypoints.

In another example, an apparatus for matching keypoints between images is provided that includes at least one memory and at least one processor (e.g., configured in circuitry) coupled to the at least one memory. The at least one processor configured to: receive transformed first descriptors of first keypoints of a first image, the first image captured from a first viewing angle, the transformed first descriptors related to a second viewing angle; obtain a second image captured from the second viewing angle; and determine second keypoints of the second image based on the transformed first descriptors, wherein the second keypoints match the first keypoints.

In another example, a non-transitory computer-readable medium is provided that has stored thereon instructions that, when executed by one or more processors, cause the one or more processors to: receive transformed first descriptors of first keypoints of a first image, the first image captured from a first viewing angle, the transformed first descriptors related to a second viewing angle; obtain a second image captured from the second viewing angle; and determine second keypoints of the second image based on the transformed first descriptors, wherein the second keypoints match the first keypoints.

In another example, an apparatus for matching keypoints between images is provided. The apparatus includes: means for receiving transformed first descriptors of first keypoints of a first image, the first image captured from a first viewing angle, the transformed first descriptors related to a second viewing angle; means for obtaining a second image captured from the second viewing angle; and means for determining second keypoints of the second image based on the transformed first descriptors, wherein the second keypoints match the first keypoints.

In some aspects, one or more of the apparatuses described herein is, can be part of, or can include a mobile device (e.g., a mobile telephone or so-called "smart phone", a tablet computer, or other type of mobile device), an extended reality device (e.g., a virtual reality (VR) device, an augmented reality (AR) device, or a mixed reality (MR) device), a vehicle (or a computing device or system of a vehicle), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
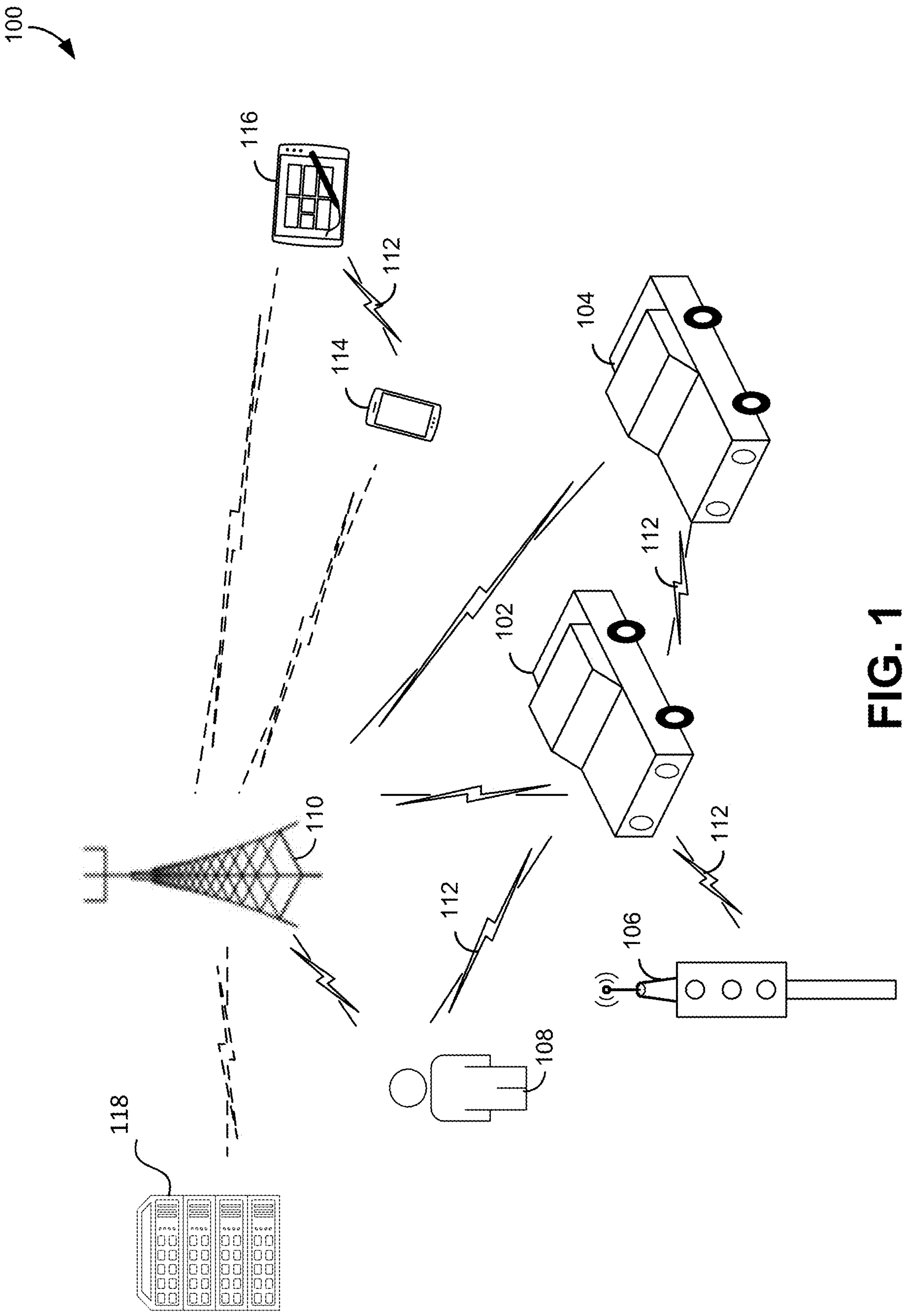
FIG. 1 illustrates an example of a wireless communication network, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms “exemplary” and/or “example” are used herein to mean “serving as an example, instance, or illustration.” Any aspect described herein as “exemplary” and/or “example” is not necessarily to be construed as preferred or advantageous over other aspects. Likewise, the term “aspects of the disclosure” does not require that all aspects of the disclosure include the discussed feature, advantage, or mode of operation.

Cameras are common and reliable sensors available in modern devices, such as vehicles, mobile devices, extended reality (XR) devices (e.g., virtual reality (VR) devices, augmented reality (AR) devices, and/or mixed reality (MR) devices), robotics devices, among others. For example, cameras can be used by vehicles for real-time environment awareness (e.g., positioning of other vehicles relative to the current position/heading of ego-vehicle). One limitation of vehicle-mounted sensors (including cameras) is that such sensors are often positioned at the street level, hence the area/region such cameras can survey is limited as well as susceptible to occlusions (e.g., presence of other vehicles directly in front of one or more sensors). One approach to surpass this limitation is to share sensing information among vehicles (in the same area), effectively achieving a form of sensing diversity (this may be referred to in the art as “cooperative sensing”). For example, a first vehicle may include a camera that is blocked by a second vehicle and is thus not able to observe an object/event of interest. The first vehicle may be informed of the second vehicle by a third vehicle that includes a sensor (e.g., a camera) with a clear view of the second vehicle. This approach can be achieved by computer vision (CV) tools that identify objects/events (semantic segmentation) in one or more images from at least one camera of a vehicle.

One implementation of a cooperative sensing approach includes sharing “points of interest” or “keypoints” in the image (instead of, or, in addition to, sharing images, detected “objects,” and/or “events”). In CV, “points of interest” or “keypoints” of an image are points (e.g., “pixels”) that “stand out” and are easily distinguishable from other pixels. Keypoints may be pixels in the image that can be easily tracked from frame to frame. Corners (of objects) are an example of keypoints. Keypoints are described by “descriptors” that include, for example, information about the image intensity (and variations) within a neighborhood in the image surrounding the keypoint (pixel). A keypoint and a corresponding descriptor for the keypoint may be referred to as a feature. Common descriptors include, as examples, Harris corner points, Features from Accelerated Segment Test (FAST), Scale Invariant Feature Transform (SIFT), Binary Robust Independent Elementary Features (BRIEF), Oriented FAST and Rotated Brief (ORB), and Histogram of Gradient orientations (HOG). Such descriptors are designed so that the descriptors are invariant (i.e., insensitive) to translations, rotations, and scaling of the image to which the keypoint belong. This causes keypoints of one image to be identifiable in another image that is a translated and/or rotated and/or scaled version of the first image. In the present disclosure, references to sharing, transmitting, and/or providing, keypoints may refer to sharing, transmitting, and/or providing descriptors of the keypoints. In the present disclosure, the term “image data” may include descriptors of points of interest and/or keypoints. For example, sharing image data may include sharing descriptors of keypoints of image data.

Sharing keypoints between vehicles may be used for tasks like highly-accurate identification of relative position (pose) between vehicles and/or absolute positioning of vehicles. Keypoints with descriptors (such as SIRF or ORB) can be independently redetected in each frame followed by a matching/association procedure. For example, keypoints may be independently detected and matched between two images captured by two cameras. The 2-D displacement of several (stationary) keypoints detected and tracked across two images from two different cameras (or two different viewing angles) is sufficient to recover the 3-D displacement of the cameras up to a global scale factor. Relative camera poses can be inferred using several methods. For example, forming and factoring the essential matrix (8 keypoints), Nister’s method (5 keypoints), and/or a Perspective-N-Point (PNP) method if keypoint depth is being tracked (from 3 keypoints).

An example of cooperative sensing involves two vehicles. A first vehicle may identify keypoints in a first image. The first vehicle may share descriptors of the keypoints with a second vehicle. The second vehicle, assuming its camera is observing roughly the same scene as the first vehicle, although not necessarily from the exact same location/viewing angle, may identify (“match”) the received keypoints with points a second image of captured at the second vehicle based on the points in the second image having similar descriptors to the descriptors shared by the first vehicle. The second vehicle may identify a relative pose (e.g., location and orientation) of the second vehicle relative to the first vehicle based on the matched keypoints.

In automotive scenarios, the two images involved may be obtained from cameras belonging to different devices (e.g., different vehicles and/or traffic cameras). This means that, even if the two devices observe the same scene, their cameras will not, in general, have the same location and orientation, hence their corresponding images are not a translated/rotated/scaled version of each other. In CV, the two images are related by a, so called, projective transformation, which is more general (i.e., includes additional effects) than a translation/rotation/scaling transformation (the latter is referred to as similarity transform).

Descriptors may be robust to projective transformations, as long as the viewing angle difference is sufficiently small. In other words, as long as the two images have been obtained from cameras closely located and with similar angles (40-50 degrees may be an upper limit to achieve a modest probability of achieving matching). Matching becomes much more improbable for greater viewing angle differences.

Common descriptors used in CV to characterize keypoints have limitations in terms of maximum difference of viewing angles in the 3D space for matching to be achieved. Matching descriptors between images may fail when the viewing angle between the two cameras which captured the images is large. For example, the background (e.g., intensity, color, etc.) of a corner (which may be a keypoint) may look very different, depending on the viewing angle, resulting in very different descriptors of this same corner viewed by different viewing angles. For automotive applications, differences in viewing angles often complicates (or makes impossible) the matching of keypoints. For example, a vehicle may be unable to match keypoints shared by a traffic camera.

Systems, apparatuses, methods (also referred to as processes), and computer-readable media (collectively referred to herein as "systems and techniques") are described herein for sharing image data (e.g., keypoints of images), and matching keypoints between images, for example, for location determination. For example, the systems and techniques may include a first device (e.g., a vehicle, a roadside unit, a robot, or a mobile device) capturing a first image of a scene from a first viewing angle and generating first keypoints and first descriptors based on the first image. The systems and techniques may also include a second device (e.g., a vehicle, a roadside unit, a robot, or a mobile device) capturing a second image of the scene from a second viewing angle and generating second keypoints and second descriptors based on the second image. The systems and techniques may transform the first descriptors and compare the transformed first descriptors to the second descriptors to match the first keypoints with matching keypoints of the second keypoints.

By transforming the first descriptors, the systems and techniques may alter the first descriptors (based on the first image obtained from a first viewing angle) to be more like the first descriptors would be if the first keypoints were derived from an image captured from the second viewing angle. The second descriptors may have a higher probability of matching with the transformed first descriptors than with the first descriptors. For example, a matching algorithm may be able to match more of the second descriptors with the transformed first descriptors than the matching algorithm matches with the first descriptors.

After matching the second descriptors with the transformed first descriptors, the systems and techniques may determine a relative pose between the first viewing angle and the second viewing angle based on the matching keypoints. For example, the systems and techniques may infer a relative pose between the first viewing angle and the second viewing angle using, for example, an essential matrix, Nister's method, and/or a PNP method.

As an example of transforming the first descriptors, the systems and techniques may provide the first descriptors to a machine-learning model that may generate the transformed first descriptors based on the second descriptors. Prior to deployment in the systems and techniques, the machine-learning model may have been trained to generate second-viewing-angle descriptors based on first-viewing-angle descriptors.

For example, a corpus of training data may include a number of first descriptors based on first images of a number of scenes captured from a first viewing angle and a corresponding number second descriptors based on second images of the same scenes captured from a second viewing angle. In the corpus training data, the relationship between the first viewing angle and the second viewing angle may be substantially consistent. For example, for all of the pairs of first and second images of a scene, the difference between the first viewing angle and the second viewing angle may be substantially the same. For instance, the training data may include descriptors based on first and second images of a first scene. The first image of the first scene may be captured from a first viewing angle and the second image of the first scene may be captured from a second viewing angle that is 15 degrees away (measured as an arc length from a point at a center of the scene) from the first viewing angle. Additionally, the training data may include descriptors based on first and second images of a second scene. The second image of the second scene may be captured from a second viewing angle that is 15 degrees away from the first viewing angle.

The number of first descriptors may be provided to the machine-learning model (e.g., one at a time in an iterative back-propagation training process). The machine-learning model may alter the descriptors. The altered descriptors may be compared to the provided second descriptors and a difference (e.g., an error) between the altered descriptors and the provided second descriptors may be determined. Parameters (e.g., weights) of the machine-learning model may be adjusted based on the difference such that in future iterations of the training process, the machine-learning model may alter the first descriptors to be more like the second descriptors. After a number of iterations of the training process, the machine-learning model may be deployed in the systems and techniques to determine the second descriptors based on the first descriptors.

The machine-learning model may be specific to the difference between the first viewing angle and the second viewing angle, for example, based on the machine-learning model having been trained using pairs of images captured from substantially consistent relative viewing angles. Accordingly, in some cases, the systems and techniques may determine to use the machine-learning model based on a relative difference between the first viewing angle from which the first image is captured and the second viewing angle from which the second image is captured aligning with the relative viewing angle of the machine-learning model.

For example, the systems and techniques may determine a coarse relative pose between the first viewing angle from which the first image is captured and the second viewing angle from which the second image is captured. Thereafter the systems and techniques may select the machine-learning model from a number of machine-learning models based on the machine-learning model most closely matching the coarse relative pose.

As another example, the systems and techniques may transform the first descriptors using a number of machine-learning models and compare all of the transformed first descriptors with the second descriptors. The systems and techniques determine which of the transformed first descriptors matched with the most of the second descriptors and use the keypoints from the transformed first descriptors that matched with the most of the second descriptors (e.g., to determine the relative pose of the first viewing angle to the second viewing angle).

As yet another example, the systems and techniques may have information indicative of an expected relative pose between viewing angles. For example, the first device may be stationary (e.g., a roadside unit). The second device may be expected to travel on a road that passes near the first device. The systems and techniques may use a machine-learning model trained using images from relative viewing angles that are substantially the same as the expected relative pose.

In some aspects, the second device may transform the first descriptors. For example, the first device may transmit the first descriptors to the second device. The second device may have access to a machine-learning model (or multiple machine-learning models) and the second device may use the machine-learning model to transform the first descriptors. For example, the second device may store the machine-learning model locally (e.g., at a memory of the second device). As another example, the second device may obtain the machine-learning model from a cloud server.

In other aspects, the first device may transform the first descriptors. For example, the first device may determine the first descriptors. The first device may have access to a machine-learning model (or multiple machine-learning models) and the first device may use the machine-learning model to transform the first descriptors. For example, the first device may store the machine-learning model locally (e.g., at a memory of the first device). As another example, the first device may obtain the machine-learning model from a cloud server. After transforming the first descriptors, the first device may transmit the transformed first descriptors to the second device.

Various aspects of the application will be described with respect to the figures below.

FIG. 1 illustrates an example of a wireless communication network 100, according to various aspects of the present disclosure. Wireless communication networks (e.g. wireless communication network 100) are deployed to provide various communication services such as voice, video, packet data, messaging, broadcast, and the like. Wireless communication network 100 may support both access links and sidelinks for communication between wireless devices. An access link may refer to any communication link between a client device (e.g., a user equipment (UE), such as UE 114 and/or UE 116, a vehicle 102 (which may be, or may include, a UE), or other client device), and a base station (e.g., a 3GPP gNB, a 3GPP eNB, a Wi-Fi access point (AP), or other base station). For example, an access link may support uplink signaling, downlink signaling, connection procedures, etc.

Uplink and/or downlink signaling may allow client devices to communicate with a server 118. Server 118 may provide various services for the client devices. For example, vehicle 102 may communicate with server 118 via base station 110 in what may be referred to as Car-to-Cloud (C2C) communications. As such server 118 may be referred to as a C2C server.

A sidelink may refer to any communication link between client devices (e.g., vehicle 102, vehicle 104, UE 114, UE 116, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 GHZ or 6 GHZ). As used herein, the term sidelink may refer to 3GPP sidelink (e.g., using a PC5 sidelink interface), Wi-Fi direct communications (e.g., according to a Dedicated Short-Range Communication (DSRC) protocol), or using any other direct device-to-device communication protocol.

V2X communications may include communications between vehicles (e.g., vehicle-to-vehicle (V2V)), communications between vehicles and infrastructure (e.g., vehicle-to-infrastructure (V2I)), communications between vehicles and pedestrians (e.g., vehicle-to-pedestrian (V2P)), and/or communications between vehicles and network severs (vehicle-to-network (V2N)). For V2V, V2P, and V2I communications, data packets may be sent directly (e.g., using a PC5 interface, using an 802.11 DSRC interface, etc.) between vehicles without going through the network, eNB, or gNB. V2X-enabled vehicles, for instance, may use a short-range direct-communication mode that provides 160° non-line-of-sight (NLOS) awareness, complementing onboard line-of-sight (LOS) sensors, such as cameras, radio detection and ranging (RADAR), Light Detection and Ranging (LIDAR), among other sensors. The combination of wireless technology and onboard sensors enables V2X vehicles to visually observe, hear, and/or anticipate potential driving hazards (e.g., at blind intersections, in poor weather conditions, and/or in other scenarios). V2X vehicles may also understand alerts or notifications from other V2X-enabled vehicles (based on V2V communications), from infrastructure systems (based on V2I communications), and from user devices (based on V2P communications). Infrastructure systems may include roads, stop lights, road signs, bridges, toll booths, and/or other infrastructure systems that may communicate with vehicles using V2I messaging.

Depending on the desired implementation, sidelink communications may be performed according to 3GPP communication protocols sidelink (e.g., using a PC5 sidelink interface according to LTE, 5G, etc.), Wi-Fi direct communication protocols (e.g., DSRC protocol), or using any other device-to-device communication protocol. In some examples, sidelink communication may be performed using one or more Unlicensed National Information Infrastructure (U-NII) bands. For instance, sidelink communications may be performed in bands corresponding to the U-NII-4 band (5.850-5.925 GHZ), the U-NII-5 band (5.925-6.425 GHZ), the U-NII-6 band (6.425-6.225 GHZ), the U-NII-7 band (6.225-6.875 GHZ), the U-NII-8 band (6.875-7.125 GHZ), or any other frequency band that may be suitable for performing sidelink communications.

In some examples, sidelink communication may include D2D or V2X communication. V2X communication involves the wireless exchange of information directly between not only vehicles (e.g., vehicle 102 and vehicle 104) themselves, but also directly between vehicle 102 and/or vehicle 104 and infrastructure, for example, roadside units (e.g., roadside unit 106), such as streetlights, buildings, traffic cameras, tollbooths, or other stationary objects. V2X communication may also include the wireless exchange of information directly between vehicle 102 and/or vehicle 104, pedestrians (e.g., a UE of pedestrian 108), wireless communication networks (e.g., base station 110), UE 114, and/or UE 116. In some examples, V2X communication may be implemented in accordance with the New Radio (NR) cellular V2X standard defined by 3GPP, Release 16, or other suitable standard.

V2X communication enables vehicle 102 and/or vehicle 104 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 102 and/or vehicle 104 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist (e.g., pedestrian 108) may be utilized to trigger a warning sound, vibration, flashing light, etc., in case of imminent danger.

The sidelink communication between vehicle 102, vehicle 104, roadside unit 106, a UE of pedestrian 108, UE 114, and/or UE 116, may occur over a sidelink 112 utilizing a proximity service (ProSe) PC5 interface. In various aspects of the disclosure, the PC5 interface may further be utilized to support D2D sidelink 112 communication in other proximity use cases (e.g., other than V2X). Examples of other proximity use cases may include smart wearables, public safety, or commercial (e.g., entertainment, education, office, medical, and/or interactive) based proximity services.

Keypoints (which may be referred to alternatively as "visual features" or as "points of interest") may be shared via sidelink communications (e.g., V2V and/or V2X) to determine location information of a client (e.g., vehicle 102 or vehicle 104). For example, vehicle 102, vehicle 104, and/or roadside unit 106 may share descriptors of points of interest. Vehicle 102 and/or vehicle 104 may determine its location based on the shared points of interest.

Additionally or alternatively, client devices may receive and/or share mapping functions, (e.g., machine-learning models) via sidelink communications and/or downlink signaling. For example, in some cases, client devices may share mapping functions between themselves, for instance, roadside unit 106 may share mapping functions with vehicle 102 and/or vehicle 104. Additionally or alternatively, server 118 may provide mapping functions to vehicle 102 and/or vehicle 104 via downlink signaling.

Figure 2:
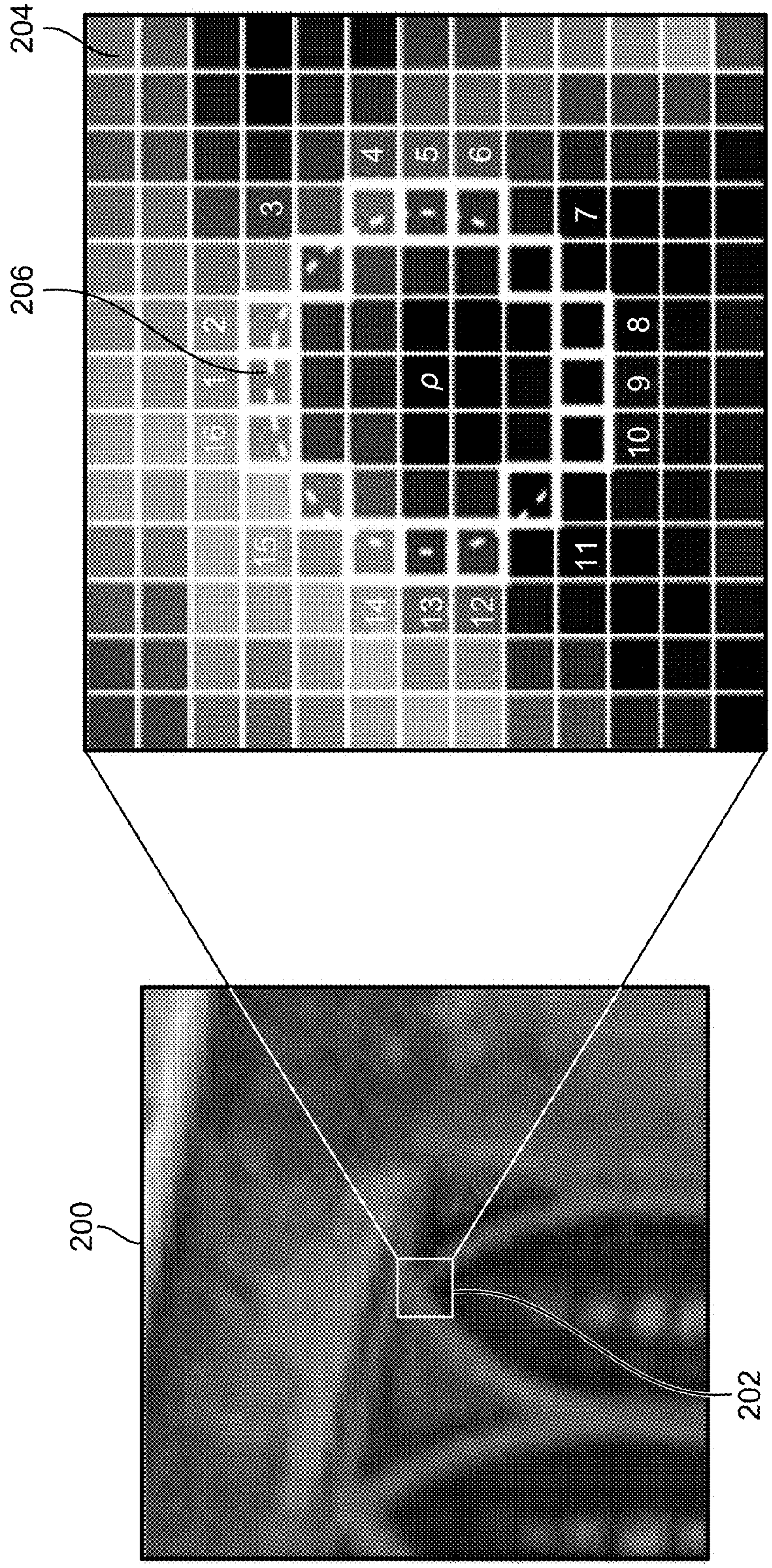
FIG. 2 is a diagram illustrating an example of an image including a keypoint according to various aspects of the present disclosure.

FIG. 2 is a diagram illustrating an example of an image 200 including a keypoint p according to various aspects of the present disclosure. Keypoint p is surrounded by a window 202 of pixels 204 in the image 200. Keypoint p may be selected such that keypoint p can be matched between images. Keypoint p is, as an example, a corner point on an object. In the art a keypoint may be alternatively referred to as a visual feature, a point of interest or a key point. An example corner-detection method described with regard to FIG. 2. In particular, FIG. 2 illustrates the Features from Accelerated Segment Test (FAST) technique (Machine Learning for High-Speed Corner Detection, Edward Rosten & Tom Drummond, ECCV 2006: Computer Vision-ECCV 2006 pp 430-443, Part of the Lecture Notes in Computer Science book series (LNIP, volume 3951)). In the FAST method, a pixel under test p with intensity Ip may be identified as an interest point. A circle 206 of sixteen pixels (pixels 1-16) around the pixel under test p (e.g., a Bresenham circle of radius 3) may then be identified. The pixel p may be considered a corner point if there exists a set of n contiguous pixels in circle 206 of sixteen pixels that are all brighter than Ip+t, or all darker than Ip-t, where t is a threshold value and n is configurable. In this example, n may be twelve. For example, the intensity of pixels 1, 5, 9, and 13 of the circle may be compared with Ip. If at least three of the four pixels do not satisfy the threshold criteria, the pixel p is not considered an interest point. As can be seen in FIG. 2, at least three of the four pixels satisfy the threshold criteria. Therefore, all sixteen pixels may be compared to pixel p to determine if twelve contiguous pixels meet the threshold criteria. This process may be repeated for each of pixels 204 in the image 200 to identify the corner points corresponding to keypoint p in image 200.

Although FIG. 2 illustrates a FAST point-of-interest identifying method, it should be understood that the present disclosure is applicable to any point-of-interest identifying method. Examples of point-of-interest identifying methods may include, but are not limited to, SURF (speeded-up robust features), SIFT (scale-invariant feature transform), ORB (oriented FAST (features from accelerated segment test) and rotated BRIEF (binary robust independent elementary feature)), BRIEF, and Harris corner point.

As indicated above, a keypoint p represents a feature of an image 200 that may be matched between multiple images of a scene. For example, various cross-correlation or optical flow methods may match features (keypoints) across multiple images. In some examples, each feature may further include a feature descriptor that assists with the matching process. A feature descriptor may summarize, in vector format (e.g., of constant length) one or more characteristics of the window 202. For example, the feature descriptor may correspond to the intensity of the window 202. In general, feature descriptors are independent of the positions of keypoint p, robust against image transformations, and scale independently. Thus, keypoints with feature descriptors may be independently re-detected in each image frame and then subjected to a keypoint matching/tracking procedure. For example, the keypoints in two different images with matching descriptors and the smallest distance between them may be considered to be matching keypoints. Examples of feature-descriptor methods may include, but are not limited to, ORB, SURF, and BRIEF.

A relative pose of two cameras may be calculated based on the two-dimensional displacement of a plurality of keypoints in images from each of the cameras. For example, the pose may be determined by forming and factoring an essential matrix using eight keypoints or using Nister's method with five keypoints. As another example, a Perspective-n-Point (PnP) algorithm with three keypoints may be used to determine the pose if keypoint depth is also being tracked. In some aspects, images captured by different cameras (e.g., of different devices or vehicles) that contain a minimum number of the same features (e.g., based on the pose determination method) may be used to determine the relative pose between the cameras.

Figure 3:
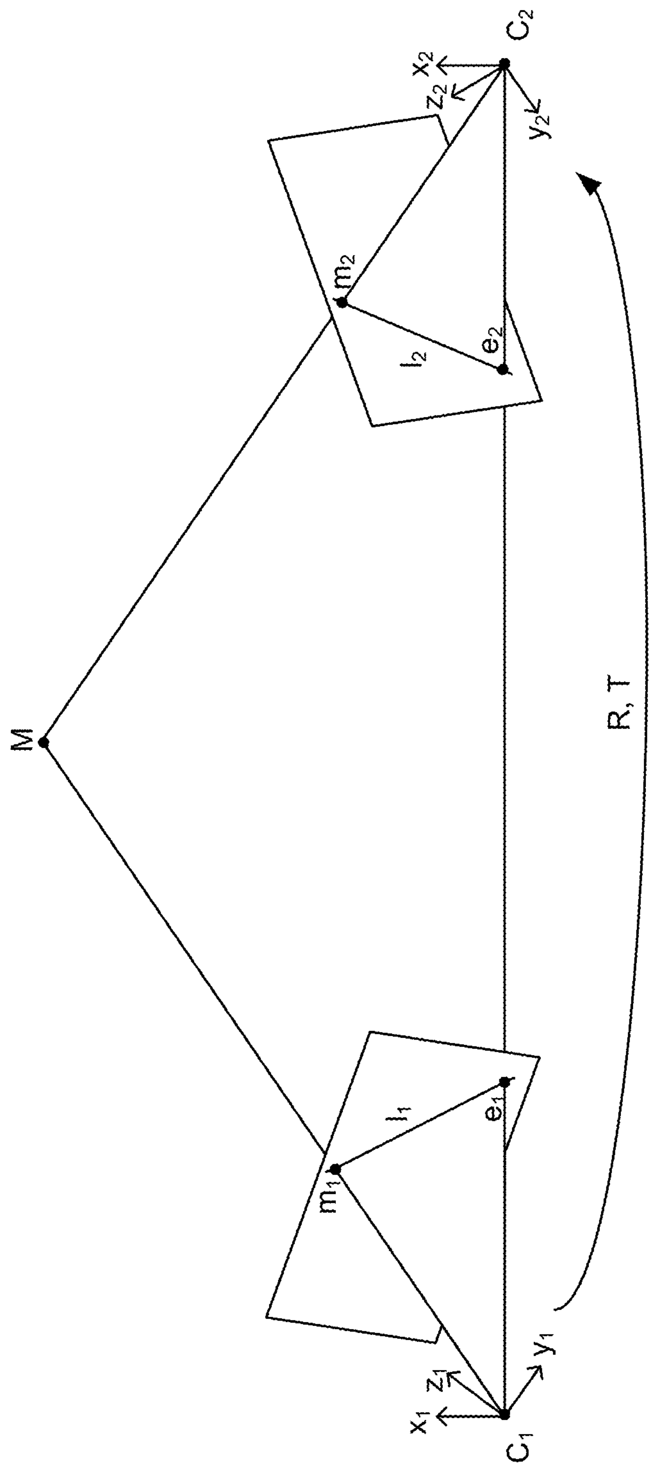
FIG. 3 is a diagram illustrating an example of relative pose determination using points of interest from images captured at different cameras according to various aspects of the present disclosure.

FIG. 3 is a diagram illustrating an example of relative pose determination using keypoints from images captured at different cameras C1 and C2 according to various aspects of the present disclosure. In the example shown in FIG. 3, each of the cameras C1 and C2 may be positioned on a different wireless communication device, such as a vehicle or roadside unit. A real point M in three-dimensional space (x, y, z) may be projected onto the respective image planes I1 and 12 of each of the vehicle cameras C1 and C2 to produce features (keypoints) m1 and m2. By correlating or associating (e.g., matching) multiple sets of features (e.g., corresponding to multiple real points), the epipolar constraint (e.g., line 11 between m1 and e1 and line 12 between m2 and e2) on the relative vehicle pose may be extracted. As a result, based on the keypoints of multiple real points and the epipolar constraint, a first wireless communication device associated with camera C1 may determine the relative pose (Rotation (R), Translation (T)) of the first wireless communication device with respect to a second wireless communication device associated with camera C2. If the location of one camera C1 or camera C2 (in a global coordinate system) is known, the relative pose may be used to determine the location of the other of the cameras (in the global coordinate system).

Figure 4:
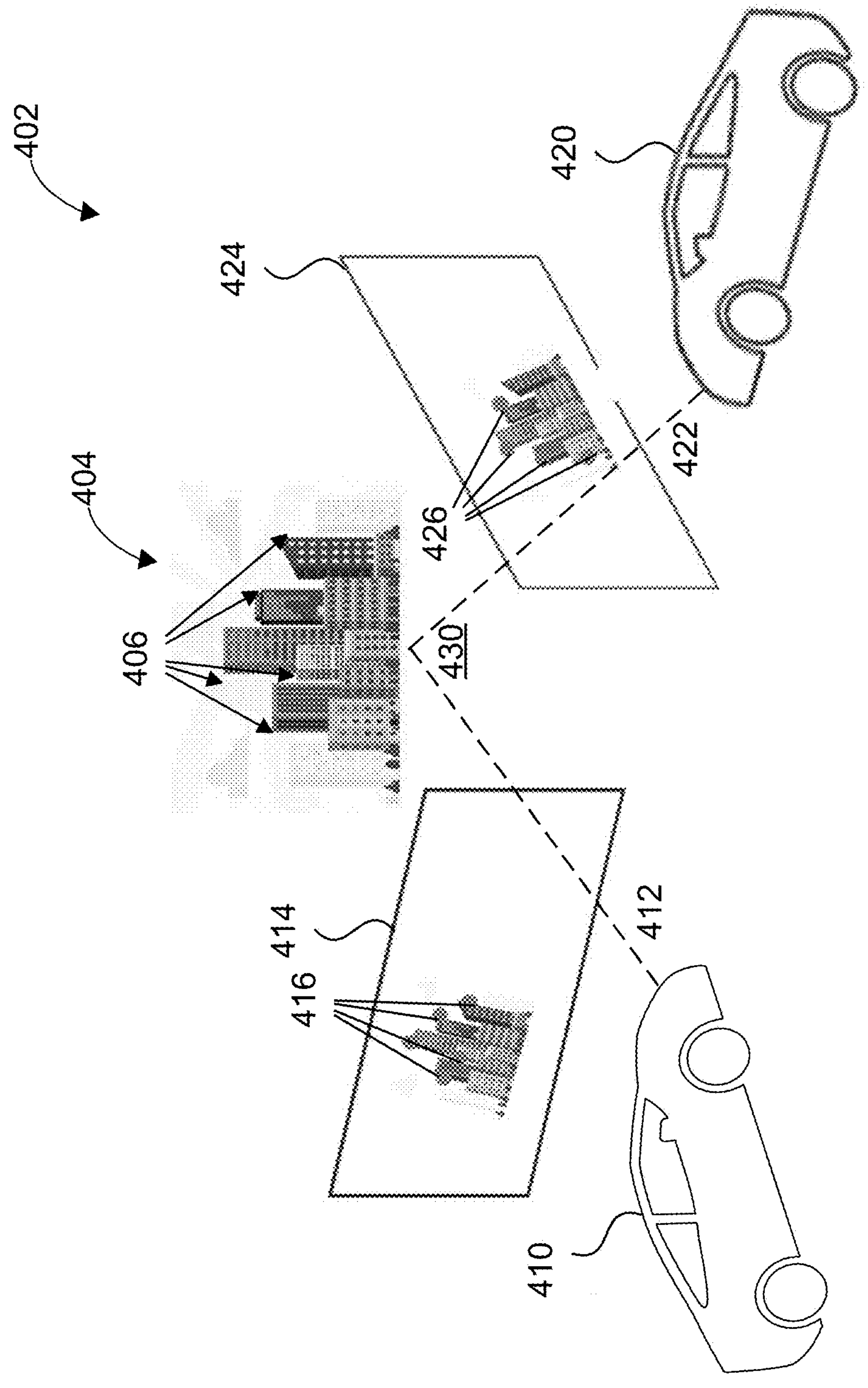
FIG. 4 is a diagram illustrating an example environment in which an example system may share and match keypoints (e.g., for location determination), according to various aspects of the present disclosure.

FIG. 4 is a diagram illustrating an example environment 400 in which an example system 402 may share and match keypoints (e.g., for location determination), according to various aspects of the present disclosure. The environment includes a scene 404 and system 402, which includes device 410 and device 420 arranged with various viewing angles relative to scene 404. For example, device 410 may view scene 404 from a viewing angle 412, and device 420 may view scene 404 from a viewing angle 422. Relative viewing angle 430 may be an illustration of a difference between the first viewing angle of device 410 and the second viewing angle of device 420. Relative viewing angle 430 may be measured along an arc centered at a point in scene 404.

Device 410 may capture image 414 of scene 404 from viewing angle 412 and determine keypoints 416 of image 414. Keypoints 416 may correspond to points 406 in scene 404. For example, keypoints 416 may represent points 406 in image 414. Similarly, device 420 may capture image 424 of scene 404 from viewing angle 422 and determine keypoints 426 of image 424. Keypoints 426 may correspond to points 406 in scene 404. For example, keypoints 426 may represent points 406 in image 414. Thus, keypoints 416 may correspond to keypoints 426.

In some situations, viewing angle 412 of device 410 relative to scene 404 may be similar enough to viewing angle 422 of device 420 relative to scene 404 that device 420 may be able to match keypoints 416 of image 414 (as described by descriptors generated by device 410) with keypoints 426 of image 424 captured by device 410. In other words, relative viewing angle 430 may be small enough that device 420 may be able to match keypoints 416 with keypoints 426 based in descriptors of keypoints 416. In other situations, viewing angle 412 of device 410 relative to scene 404 may not be similar enough to viewing angle 422 of device 420 relative to scene 404 for device 420 to match keypoints 416 of image 414 (as described by descriptors generated by device 410) with keypoints 426 of image 424 captured by device 420. In other words, relative viewing angle 430 may be too large for device 420 to match a sufficient number of keypoints 416 with corresponding keypoints of image 424 based on descriptors of keypoints 416.

System 402 may transform the descriptors of keypoints 416 such that device 420 is able to match keypoints 416 with keypoints 426 based on the transformed descriptors. By transforming the descriptors of keypoints 416, system 402 may alter the descriptors of keypoints 416 to be more like the descriptors would be if keypoints 416 were derived from an image captured from viewing angle 422. In other words, Transforming the descriptors of keypoints 416 may cause the descriptors of keypoints 416 to be more like the descriptors of keypoints 426. The descriptors of keypoints 426 may have a higher chance of matching with the transformed descriptors of keypoints 416 than the descriptors of keypoints 426 have with matching with the descriptors of keypoints 416. For example, device 420 may have a higher probability of matching the transformed descriptors of keypoints 416 with the descriptors of keypoints 426 than device 420 had of matching the descriptors of keypoints 416 with the descriptors of keypoints 426.

After device 420 matches the descriptors of keypoints 426 with the transformed first descriptors of keypoints 416, device 420 may determine a relative pose between viewing angle 422 and viewing angle 412 (and/or or a relative pose between device 410 and de vice 420) (e.g., as described above with regard to FIG. 3). To determine the relative pose, device 420 may use, for example, an essential matrix, Nister's method, and/or a PNP method.

Figure 5A:
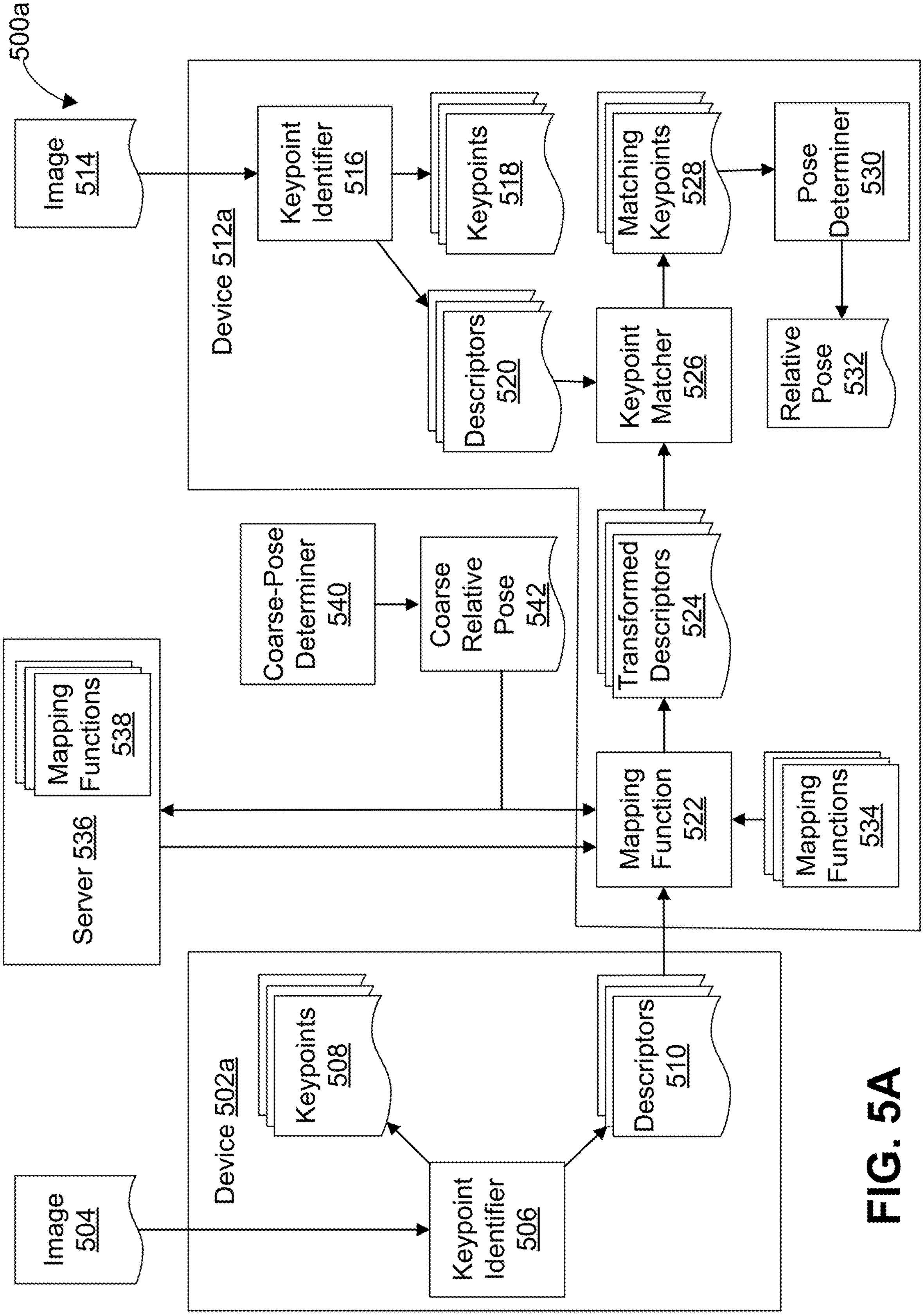
FIG. 5A is a block diagram illustrating an example system for sharing image data and determining matching keypoints, according to various aspects of the present disclosure.

FIG. 5A is a block diagram illustrating an example system 500*a* for sharing image data, and determining matching keypoints according to various aspects of the present disclosure. System 500*a* includes device 502*a* and device 512*a*. Device 502*a* may share image data with device 512*a*. According to the example of system 500*a* of FIG. 5A, device 502*a* may share descriptors 510 (which may describe keypoints 508 of image 504) with device 512*a*. Device 512*a* may use mapping function 522 to transform descriptors 510 into transformed descriptors 524. Device 512*a* may match transformed descriptors 524 with descriptors 520 (which may describe keypoints 518 of image 514) to determine matching keypoints 528. Device 512*a* may determine relative pose 532 based on matching keypoints 528.

Device 502*a* and device 512*a* may be, may include, or may be included in any suitable respective computing devices. For example, device 502*a* and device 512*a* may be, may include, or may be included in respective vehicles, roadside units (e.g., a traffic camera), or mobile devices (e.g., smartphones or tablets). For example, any of vehicle 102, vehicle 104, roadside unit 106, UE 114, UE 116, of FIG. 1, or device 410 of FIG. 4 may be an example of device 502*a*. Another one of vehicle 102, vehicle 104, roadside unit 106, UE 114, UE 116, of FIG. 1, or device 420 of FIG. 4 may be an example of device 512*a*.

Device 502*a* may obtain image 504 and device 512*a* may obtain image 514. In some cases, device 502*a* and device 512*a* may include respective cameras. In other cases, device 502*a* and device 512*a* may be communicatively coupled to respective cameras which may capture image 504 and image 514 respectively. Image 504 may be an image of a scene captured from a first viewing angle. For example, image 414, captured of scene 404 from viewing angle 412 of FIG. 4 may be an example of image 504. Image 514 may be an image of a scene captured from a second viewing angle. For example, image 424, captured of scene 404 from viewing angle 422 of FIG. 4 may be an example of image 514.

Device 502*a* may include a keypoint identifier 506 and device 512*a* may include keypoint identifier 516. Keypoint identifier 506 and keypoint identifier 516 may be, or may include, any suitable respective computing algorithms for determining keypoints of images and descriptors of the keypoints. For example, keypoint identifier 506 and keypoint identifier 516 may include respective SURF, SIFT, BRIEF, ORB, and/or Harris corner point algorithms. Using keypoint identifier 506, device 502*a* may determine keypoints 508 of image 504 and descriptors 510 of keypoints 508. Keypoints 508 may be visually distinct points of image 504. Keypoints 416 of image 414 of FIG. 4 may be an example of keypoints 508. Descriptors 510 may be descriptive of keypoints 508 in image 504. For example, descriptors 510 may include values based on values of pixels of image 504 that are around keypoints 508. For example, p of image 200 of FIG. 2 may be an example of a keypoint of keypoints 508 and values based on pixels of or within circle 206 may be an example of a basis for descriptors based thereon. Similarly, using keypoint identifier 516, device 512*a* may determine keypoints 518 of image 514 and descriptors 520 of keypoints 518. Keypoints 518 may be visually distinct points of image 514. Keypoints 426 of image 424 of FIG. 4 may be an example of keypoints 518. Descriptors 520 may be descriptive of keypoints 518 in image 514. For example, descriptors 520 may include values based on values of pixels of image 514 that are around keypoints 518.

According to the example of system 500*a* of FIG. 5A, device 502*a* may share descriptors 510 with device 512*a*, for example, by transmitting descriptors 510 to device 512*a*. Device 512*a* may receive descriptors 510 and may use a mapping function 522 to transform descriptors 510 into transformed descriptors 524.

Mapping function 522 may be any suitable means for transforming descriptors. As an example, mapping function 522 may be, or may include, a trained machine-learning model. For example, prior to deployment in system 500*a*, mapping function 522 may have been trained to generate second-viewing-angle descriptors based on first-viewing-angle descriptors. For example, a corpus of training data may include a number of first descriptors based on first images of a number of scenes captured from a first viewing angle and a corresponding number second descriptors based on second images of the same scenes captured from a second viewing angle. In the corpus training data, the relationship between the first viewing angle and the second viewing angle may be substantially consistent. Using FIG. 4 as an example, the corpus of training data may include a number of instances of descriptors of keypoints 416 based a corresponding number of instances of images 414 of a number of respective scenes 404 and a corresponding number of instances of descriptors of keypoints 426 based on a corresponding number of instances of image 424 of the number of respective scenes 404. Keypoints 416 may correspond to keypoints 426 based on keypoints 416 and keypoints 426 both representing points 406 in scene 404. The relative viewing angle 430 between the instances of image 414 and the corresponding instances of image 424 may be substantially the same. For example, the corpus of training data may include thousands of images of different scenes captured by two cameras that are positioned at 5 degrees arc length along an arc centered at a point in the scene. Additionally or alternatively, the corpus of training data may include thousands of images of different scenes captured by two cameras that are positioned 5 meters apart and facing the same direction.

The number of first descriptors of the corpus of training data may be provided to mapping function 522 (e.g., one at a time in an iterative back-propagation training process). Mapping function 522 (or a precursor thereof) may alter the provided first descriptors to generate altered descriptors. The altered descriptors may be compared to the provided second descriptors and a difference (e.g., an error) between the altered descriptors and the provided second descriptors may be determined. Parameters (e.g., weights) of mapping function 522 may be adjusted based on the difference such that in future iterations of the training process, mapping function 522 may alter the first descriptors to be more like the provided second descriptors. After a number of iterations of the training process, mapping function 522 may be deployed in system 500*a* and may be used to determine the transformed descriptors 524 based on descriptors 510.

Because mapping function 522 was trained using pairs of images captured at a relative viewing angle, mapping function 522 may be specific to the relative viewing angle. For example, mapping function 522 may be trained to transform descriptors 510 into transformed descriptors 524 as if transformed descriptors 524 were captured from a second viewing angle. The second viewing angle may bear the same relationship to a first viewing angle from which image 504 was captured as the relative viewing angle of the data on which mapping function 522 was trained. Thus, mapping function 522 may be useful for transforming descriptors 510 when image 504 and image 514 have the same relative viewing angle as the data on which mapping function 522 was trained.

In some aspects, to allow mapping function 522 to be more broadly applicable, system 500*a* may include mapping functions 538 and/or mapping functions 534. In some cases, device 512*a* may include mapping functions 534. For example, mapping functions 534 may be locally stored at device 512*a* (e.g., in a memory of device 512*a*). Additionally or alternatively, in some cases, system 500*a* may include a server 536 that may include mapping functions 538. Server 536 may provide mapping function 522 to device 512*a*. Server 536 may be an example of server 118 of FIG. 1. In some cases, server 536 may provide mapping function 522 (and/or one or more of mapping functions 534) to device 512*a* prior to device 512*a* using mapping function 522. For example, server 536 may provide mapping function 522 (and/or one or more of mapping functions 534) to device 512*a* responsive to device 512*a* entering an environment, arriving at a location, or establishing a communicative connection to server 536. In other cases, device 512*a* may request mapping function 522 (and/or one or more of mapping functions 534) from server 536 and server 536 may provide mapping function 522 (and/or one or more of mapping functions 534) responsive to the request.

Mapping functions 538 and/or mapping functions 534 may include a number of mapping functions trained based on a respective number of relative viewing angles. For example, mapping functions 538 and/or mapping functions 534 may include one hundred mapping functions. The one hundred mapping functions may be based on images captured from ten different yaw angles and ten different roll angles. For example, a center of a scene may be defined. A first camera may be positioned at a first position relative to the center of the scene. The first camera may capture first images of the scene. A second camera may be positioned at ten different positions relative to the first position and the center of the scene, for example, at increments of 5 degrees of arc length (for a defined radial length) from the first position. At each of the position, the second camera may capture second images that may be used to generate the descriptors of the corpus of training data. Further, at each of the positions, a roll angle of the second camera may be changed through 10 different rotational angles and corresponding images may be captured. The process may be repeated for a number of scenes. All of the images with substantially the same relative viewing angle (e.g., yaw and roll) may be used to train one mapping function of mapping functions 538 and/or mapping functions 534. Thus, mapping functions 538 and mapping functions 534 may include a number of mapping functions corresponding to a respective number of relative viewing angles.

In some cases, device 502*a* and device 512*a* may both include information regarding the mapping functions 534 and/or mapping function 538. For example, device 502*a* and device 512*a* may both have access to (either in respective local memories or through a server, such as server 536) to the mapping functions 534 and/or mapping function 538. Each of the mapping functions of mapping functions 534 and/or mapping function 538 may be uniquely identified by identifiers. Device 502*a* and device 512*a* may communicate regarding which mapping function is used as mapping function 522. For example, in some cases, device 502*a* may suggest that 512*a* use a particular one of mapping functions 534 and/or mapping function 538 as mapping function 522.

To accurately transform descriptors 510, system 500*a* may select mapping function 522 from among mapping functions 538 and/or mapping functions 534 based on mapping function 522 being most applicable to the relative viewing angle between image 504 and image 514. For example, system 500*a* may select mapping function 522 based on the viewing angle on which mapping function 522 was trained most closely matching the viewing angle between image 504 and image 514.

In some cases, system 500*a* may perform a number of transformations using a number of respective mapping functions from among mapping functions 538 and/or mapping functions 534. Keypoint matcher 526 may attempt matching the transformed descriptors with descriptors 520 and may determine the transformed descriptors 524 to use based on which of the attempted matches between the transformed descriptors and descriptors 520 produced the best (or the most) matching keypoints 528.

Additionally or alternatively, system 500*a* may include a coarse-pose determiner 540 that may determine a coarse relative pose 542 between the first viewing angle from which image 504 is captured and the second viewing angle from which image 514 is captured. System 500*a* may select mapping function 522 from mapping functions 538 and/or mapping functions 534 based on the mapping function 522 most closely matching coarse relative pose 542. In some aspects, coarse-pose determiner 540 may be implemented in device 502*a*. Additionally or alternatively, coarse-pose determiner 540 may be implemented in device 512*a*. Additionally or alternatively, coarse-pose determiner 540 may be implemented in server 536. In any case, coarse-pose determiner 540 may determine coarse relative pose 542 between device 502*a* and device 512*a* and system 500*a* may determine mapping function 522 based on coarse relative pose 542.

In the present disclosure, the term "coarse relative pose" may refer to a pose estimated preliminary to determining relative pose 532 based on matching keypoints 528. Additionally or alternatively, the term "coarse relative pose" may refer to a pose determined using techniques not based on matching of keypoints between the most-recently-obtained images.

For example, coarse-pose determiner 540 may determine coarse relative pose 542 using object detection. For instance, image 504 may include device 512*a* (or a vehicle associated with, e.g., including device 512*a*) and coarse-pose determiner 540 may determine coarse relative pose 542 based on the position of device 512*a* in image 504. Additionally or alternatively, image 514 may include device 502*a* (or a vehicle associated with, e.g., including device 502) and coarse-pose determiner 540 may determine coarse relative pose 542 based on the position of device 502*a* in image 514.

As another example, device 502*a* and/or device 512*a* may include other means for determining location information of device 502*a* and/or device 512*a*, such as, for example, global positioning systems. Additionally or alternatively, device 502*a* and/or device 512*a* may determine relative location information based on sidelink (e.g., V2V) signaling. Coarse-pose determiner 540 may determine coarse relative pose 542 based on the location information from such systems or services.

As yet another example, coarse-pose determiner 540 may use previously determined relative poses to determine coarse relative pose 542. For example, image 514 may be one of series of images 514 captured by a camera and provided to device 512*a* (e.g., as device 512*a* moves). Device 512*a* may determine a relative pose 532 for each of the images 514. Coarse-pose determiner 540 may use a previously-determined relative pose 532 to determine a coarse relative pose 542 to determine a mapping function 522 to use to determine transformed descriptors 524 for a most recently-received image 514.

As yet another example, based on a location of device 502*a* and/or device 512*a*, coarse-pose determiner 540 may determine coarse relative pose 542 based on an expected relative pose between device 502*a* and device 512*a*. For example, device 502*a* may be stationary (e.g., device 502*a* may be a roadside unit). Device 512*a* may be expected to travel on a road that passes near device 502*a*. There may be a limited number of possible relative poses between device 502*a* and device 512*a* as device 512*a* passes near device 502*a*. Coarse-pose determiner 540 may select mapping function 522, at least in part, based on the limited number of possible relative poses.

As an alternative, mapping function 522 may be, or may include, an ensemble network that may encompass a broader range of relative orientations. In such a case, several (X, Y) pairs denoting the input and ground truth descriptors containing multiple relative orientations may be used for training. For example, rather than training a single machine-learning model on a single relative pose, mapping function 522 may include a machine-learning model trained on multiple relative poses. In such a case the relative pose may be provided in annotations during training and as inputs at inference.

Additionally or alternatively, mapping function 522 may be trained on training data that is related to a location in which mapping function 522 may be used. For example, mapping functions 538 may be trained using images associated with a specific location (e.g., a city). Server 536 may provide mapping function 522 (which is one of the mapping functions trained based on the specific location) to device 502*a*. Mapping functions trained using images from the location in which they are to be used may achieve improved performance because such mapping functions may account for actual visual cues in the area compared to a mapping based only on difference of orientation.

In any case, device 502*a* may use mapping function 522 to generate transformed descriptors 524 based on descriptors 510, device 512*a* may use keypoint matcher 526 to match keypoints 508 with keypoints 518, for example, by comparing descriptors 520 with transformed descriptors 524. For example, keypoint matcher 526 may compare transformed descriptors 524 (which describe keypoints 508) with descriptors 520 (which describe keypoints 518) and determine matching keypoints 528 based on the comparison. Descriptors of transformed descriptors 524 that match (e.g., within a threshold) descriptors of descriptors 520 may indicate matches between corresponding keypoints of keypoints 508 with corresponding keypoints of keypoints 518. Using FIG. 4 as an example, a subset of transformed descriptors of keypoints 416 may match a subset of descriptors of keypoints 426. The subset of transformed descriptors may be based on a subset of keypoints 416. The subset of keypoints 416 that match the corresponding subset of keypoints 426 may be an example of matching keypoints 528.

Device 512*a* may use pose determiner 530 to determine relative pose 532. Relative pose 532 may be, or may include, a relative pose between device 502*a* and device 512*a* or a relative pose between the camera which captured image 504 and the camera that captured image 514. Pose determiner 530 may determine relative pose 532 using, for example, an essential matrix, Nister's method, and/or a PNP method.

Figure 5B:
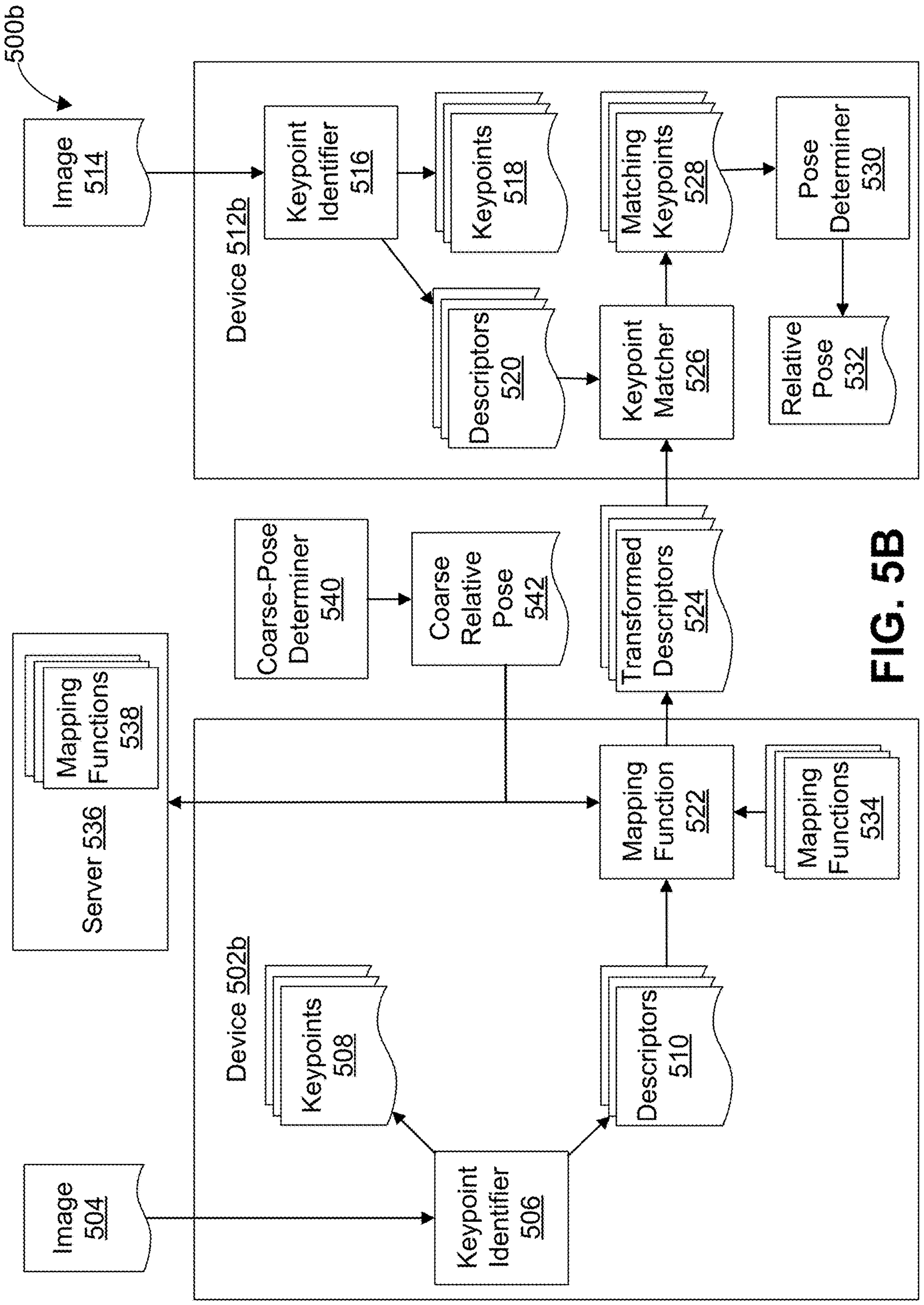
FIG. 5B is a block diagram illustrating another example system for sharing image data and determining matching keypoints, according to various aspects of the present disclosure.

FIG. 5B is a block diagram illustrating an example system 500*b* for sharing image data and determining matching keypoints, according to various aspects of the present disclosure. System 500*b* includes device 502*b* and device 512*b*. Device 502*b* may share image data with device 512*b*. According to the example of system 500*b* of FIG. 5B, device 502*b* may generate descriptors 510 (which may describe keypoints 508 of image 504) and use mapping function 522 to transform descriptors 510 into transformed descriptors 524. Device 502*b* may share transformed descriptors 524 with device 512*b*. Device 512*b* may match transformed descriptors 524 with descriptors 520 (which may describe keypoints 518 of image 514) to determine matching keypoints 528. Device 512*b* may determine relative pose 532 based on matching keypoints 528.

System 500*b* of FIG. 5B may be substantially similar to system 500*a* of FIG. 5A. A difference between system 500*b* and system 500*a* is that in system 500*b*, device 502*b* includes mapping function 522 and generates transformed descriptors 524 (and transmits transformed descriptors 524 to device 512*b*), whereas in system 500*a* device 512*a* includes mapping function 522 and generates transformed descriptors 524 (based on descriptors 510 received from device 502*a*). More specifically, according to the example of system 500*b* of FIG. 5B, device 502*b* may generate descriptors 510 based on image 504 then use mapping function 522 to generate transformed descriptors 524. Further, device 502*b* may share transformed descriptors 524 with device 512*b*, for example, by transmitting transformed descriptors 524 to device 512*b*. Further, device 502*b* may include mapping functions 534 and/or communicate with server 536 (e.g., to receive mapping function 522).

Figure 5C:
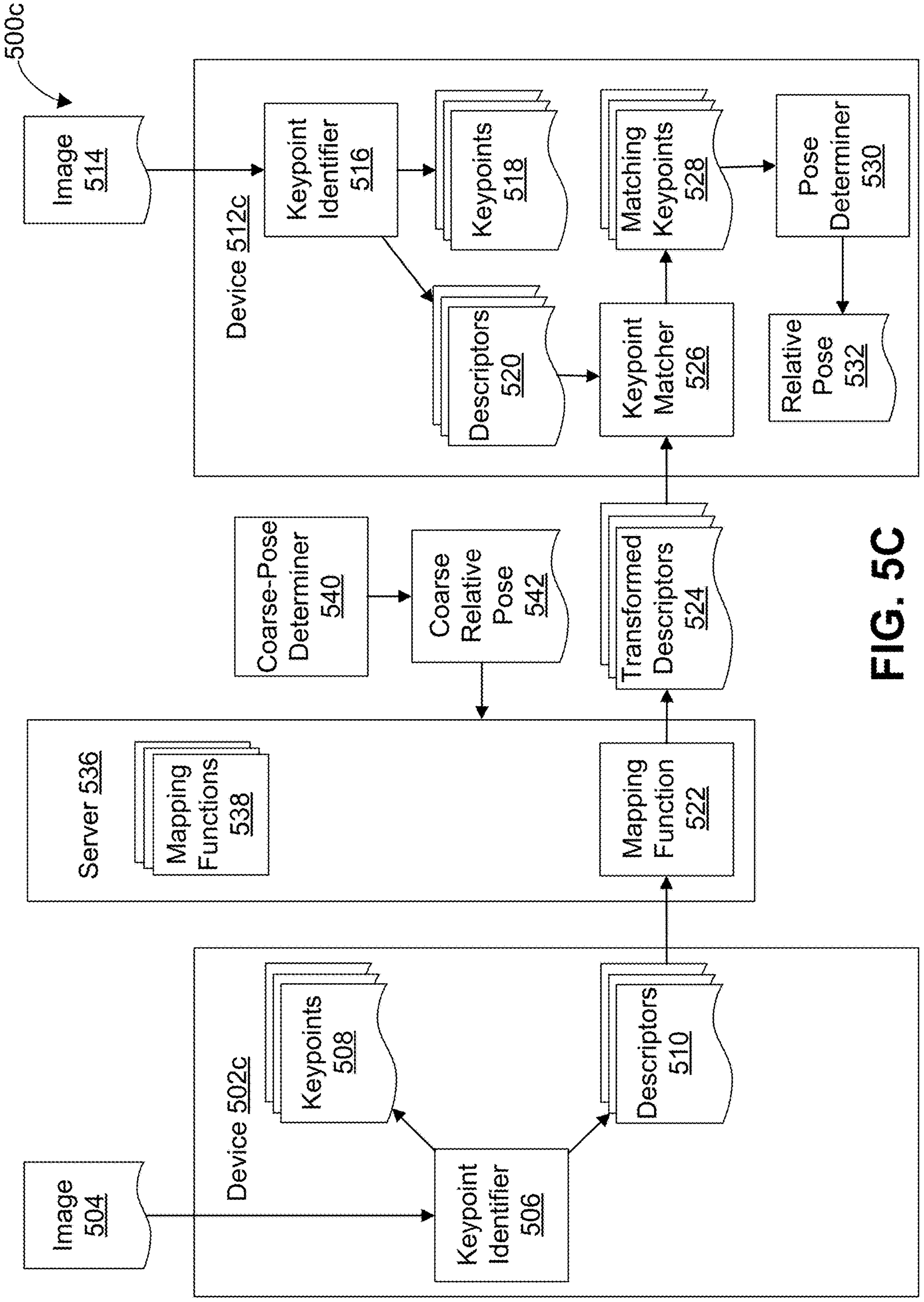
FIG. 5C is a block diagram illustrating an example system 500*c* for sharing image data and determining matching keypoints, according to various aspects of the present disclosure.

FIG. 5C is a block diagram illustrating an example system 500*c* for sharing image data and determining matching keypoints, according to various aspects of the present disclosure. System 500*c* includes device 502*c* and device 512*c*. Device 502*c* may share image data with device 512*c*. According to the example of system 500*c* of FIG. 5C, device 502*c* may generate descriptors 510 (which may describe keypoints 508 of image 504). Device 502*c* may transmit descriptors 510 to server 536. Server 536 may receive coarse relative pose 542. Server 536 may use mapping function 522 to transform descriptors 510 into transformed descriptors 524. Server 536 may transmit transformed descriptors 524 to device 512*c*. Device 512*c* may match transformed descriptors 524 with descriptors 520 (which may describe keypoints 518 of image 514) to determine matching keypoints 528. Device 512*c* may determine relative pose 532 based on matching keypoints 528.

System 500*c* of FIG. 5C may be substantially similar to system 500*a* of FIG. 5A. A difference between system 500*c* and system 500*a* is that in system 500*c*, server 536 includes mapping function 522 and generates transformed descriptors 524 (and transmits transformed descriptors 524 to device 512*c*), whereas in system 500*a* device 512*a* includes mapping function 522 and generates transformed descriptors 524 (based on descriptors 510 received from device 502*a*). More specifically, according to the example of system 500*c* of FIG. 5C, device 502*c* may generate descriptors 510 based on image 504 then transmit descriptors 510 to server 536. Serer 536 may use mapping function 522 to generate transformed descriptors 524. Further, server 536 may share transformed descriptors 524 with device 512*c*, for example, by transmitting transformed descriptors 524 to device 512*c*.

Figure 6A:
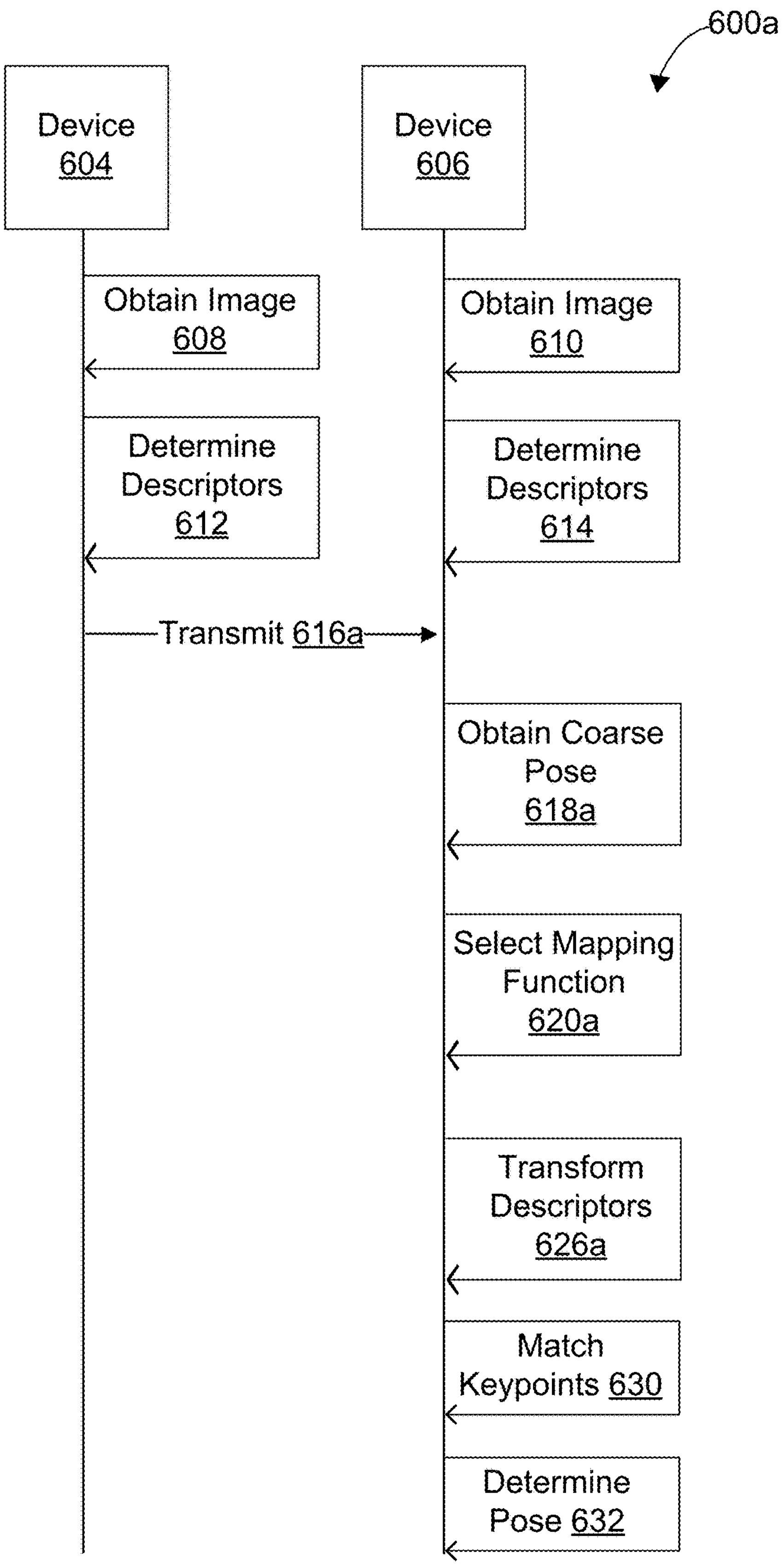
FIG. 6A is a flow diagram illustrating an example process for sharing image data and determining matching keypoints, according to various aspects of the present disclosure.

FIG. 6A is a flow diagram illustrating an example process 600*a* for sharing image data and determining matching keypoints, according to various aspects of the present disclosure. In general, process 600*a* includes device 604 obtaining an image and determining descriptors of keypoints of the image. Device 604 may share the descriptors with device 606. Device 606 may similarly obtain an image and generate descriptors based on the image. Device 606 may select a mapping function and transform the shared descriptors using the selected mapping function. Device 606 may then match the keypoints based on the transformed descriptors with keypoints based on the descriptors of the image obtained at device 606. After matching the keypoints, device 606 may determine a relative pose (e.g., between device 604 and device 606) based on the matched keypoints.

Device 604 and device 606 may be, may include, or may be included in any suitable respective computing devices. For example, device 604 and device 606 may be, may include, or may be included in respective vehicles, roadside units (e.g., a traffic camera), or mobile devices (e.g., smartphones or tablets). For example, any of vehicle 102, vehicle 104, roadside unit 106, UE 114, UE 116, of FIG. 1, device 410 of FIG. 4, device 502*a* of FIG. 5A, or device 502*b* of FIG. 5B may be an example of device 604. Another one of vehicle 102, vehicle 104, roadside unit 106, UE 114, UE 116, of FIG. 1, or device 420 of FIG. 4, device 512*a* of FIG. 5A or device 512*b* of FIG. 5B may be an example of device 606.

At operation 608, device 604 may obtain an image. For example, device 410 may obtain image 414. As another example, device 502*a* may obtain image 504. At operation 610, device 606 may obtain an image. For example, device 420 may obtain image 424. As another example, device 512*a* may obtain image 514. Although illustrated at the same height in FIG. 6A though FIG. 6D, operation 608 and operation 610 may happen at the same time, or at separate times, with either of operation 608 or operation 610 preceding the other.

At operation 612, device 604 may determine keypoints and descriptors of the keypoints. For example, device 410 may determine keypoints 416 and descriptors thereof. As another example, device 502*a* (e.g., using keypoint identifier 506) may determine keypoints 508 and descriptors 510. At operation 614, device 606 may determine keypoints and descriptors of the keypoints. For example, device 420 may determine keypoints 426 and descriptors thereof. As another example, device 512*a* (e.g., using keypoint identifier 516) may determine keypoints 518 and descriptors 520. Although illustrated at the same height in FIG. 6A though FIG. 6D, operation 612 and operation 614 may happen at the same time, or at separate times with either of operation 612 or operation 614 preceding the other.

At operation 616*a*, device 604 may transmit descriptors to device 606. For example, device 410 may transmit descriptors of keypoints 416 to device 420. As another example, device 502*a* may transmit descriptors 510 to device 512*a*.

In some aspects, at operation 618*a*, device 606 may obtain an indication of a coarse pose between device 604 and device 606. For example, device 512*a* may obtain coarse relative pose 542 from coarse-pose determiner 540. For instance, device 606 may track device 604 in the image captured at operation 610 (and/or other images) and determine the coarse pose using object tracking. As another example, device 604 may track device 606 and may provide an indication of the coarse pose to device 606.

In some aspects, at operation 620*a*, device 606 may select a mapping function to use to transform the descriptors received at operation 616*a*. For example, device 512*a* may select mapping function 522 from among mapping functions 534. Device 606 may select the mapping function based on a coarse relative pose between device 604 and device 606 (e.g., the coarse relative pose obtained at operation 618*a*). In some cases, device 606 may select one mapping function. In other cases, device 606 may select several candidate mapping functions.

At operation 626*a*, device 606 may transform the descriptors received at operation 616*a*. For example, device 512*a* may (using mapping function 522) transform descriptors 510 to generate transformed descriptors 524. In some aspects, device 606 may transform the descriptors using the mapping function (or candidate mapping functions) selected at operation 620*a*.

At operation 630, device 606 may match keypoints described by the transformed descriptors with keypoints described by the keypoints described by the descriptors determined at operation 614. For example, device 512*a* may match keypoints 508 with keypoints 518 based on a comparison between transformed descriptors 524 and descriptors 520.

At operation 632, device 606 may determine a relative pose between device 604 and device 606 based on the matched keypoints. For example, device 512*a*, using pose determiner 530, may determine relative pose 532 based on matching keypoints 528.

In some cases, at operation 626*a*, device 606 may transform the descriptors using a single mapping function selected at operation 620*a*. In other case, at operation 626*a*, device 606 may transform the descriptors with a number of mapping functions. For example, in some cases, at operation 620*a*, device 606 may select a number of candidate mapping functions. In other cases, operation 620*a* may be omitted. In any case, at operation 630, device 606 may further attempt to match keypoints described by the number of descriptors transformed at operation 626*a* with the keypoints described by the descriptors determined at operation 614. Further device 606 may determine best-matching keypoints. For example, device 606 may determine which of the number of descriptors (derived using the number of mapping functions) match the most of the descriptors determined at operation 614. At operation 632, device 606 may determine the relative pose based on the keypoints that best matched the keypoints described by the descriptors determined at operation 614.

Figure 6B:
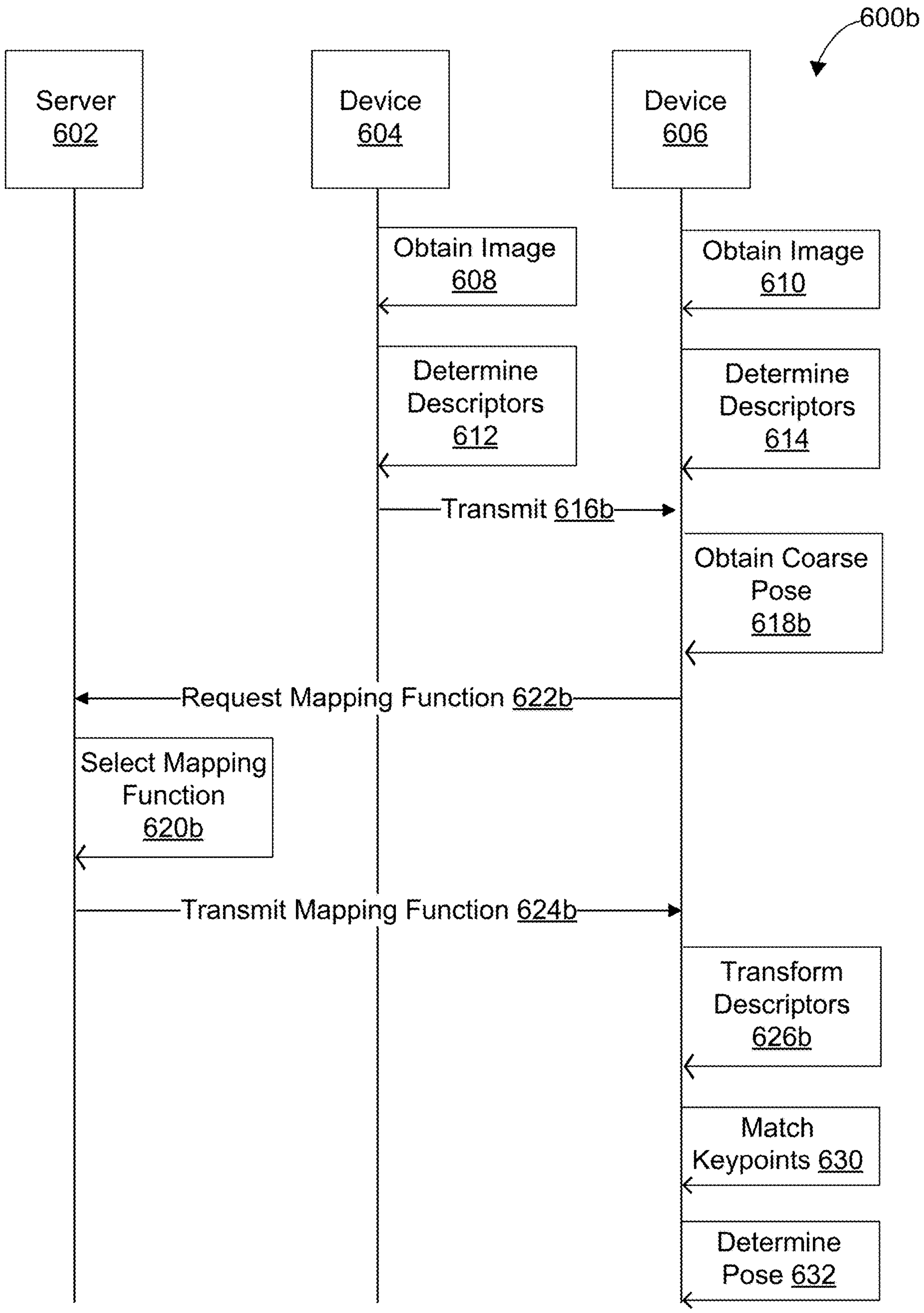
FIG. 6B is a flow diagram illustrating another example process for sharing image data and determining matching keypoints, according to various aspects of the present disclosure.

FIG. 6B is a flow diagram illustrating an example process 600*b* for sharing image data and determining matching keypoints, according to various aspects of the present disclosure. In general, process 600*b* includes device 604 obtaining an image and determining descriptors of keypoints of the image. Device 604 may share the descriptors with device 606. Device 606 may similarly obtain an image and generate descriptors based on the image. Device 606 may request a mapping function from server 602 and server 602 may provide the mapping function. Device 606 may transform the shared descriptors, using the received mapping function, then match the keypoints based on the transformed descriptors with keypoints based on the descriptors of the image obtained at device 606. After matching the keypoints, device 606 may determine a relative pose (e.g., between device 604 and device 606) based on the matched keypoints.

Server 602 may be, or may include, any suitable computing device communicatively connected to device 606 (and/or device 604). Server 602 may store a number of mapping functions and may, on request, provide a mapping function to device 606. Server 118 of FIG. 1 and mapping functions 534 of FIG. 5A and FIG. 5B may be examples of server 602.

At operation 608, device 604 may obtain an image. At operation 610, device 606 may obtain an image. At operation 612, device 604 may determine keypoints and descriptors of the keypoints. At operation 614, device 606 may determine keypoints and descriptors of the keypoints. At operation 616*b*, device 604 may transmit descriptors to device 606. In some aspects, at operation 618*b*, device 606 may obtain an indication of a coarse pose between device 604 and device 606.

In some aspects, at operation 622*b*, device 606 may request a mapping function from server 602. For example, device 512*a* may request that server 536 transmit one or more of mapping functions 538 to device 512*a*. In some aspects, the request may include an indication of the coarse pose obtained at device 606.

In some aspects, at operation 620*b*, server 602 may select one or more mapping functions to use to transform the descriptors received by device 606 at operation 616*b*. For example, server 602 may select mapping function 522 from among mapping functions 538. In some aspects, server 602 may select a single mapping function. In other cases, server 602 may select a number of candidate mapping functions. Server 602 may select the one or more mapping functions based on a coarse relative pose between device 604 and device 606 (which may be provided with the request at operation 622*b*). Additionally or alternatively, server 602 may select the one or more mapping functions based on an expected relative pose between device 604 and device 606. For example, device 604 and device 606 may be travelling on a highway or through a tunnel and the number of possible useful mapping functions may be limited by expected relative poses for vehicles traveling on the highway or through the tunnel.

At operation 624*b*, server 602 may transmit the one or more selected mapping functions to device 606. For example, server 536 may transmit mapping function 522 (and/or mapping functions 534) to device 512*a*. In some aspects, server 602 may transmit mapping functions to device 606 without receiving an explicit request for the mapping functions. For example, in some cases, server 602 may broadcast mapping functions (e.g., mapping functions corresponding to expected relative poses) regularly. As such, operation 622*b* may be optional in process 600*b*.

At operation 626*a*, device 606 may transform the descriptors received at operation 616*b* using the mapping function received at operation 624*b*. At operation 630, device 606 may match keypoints described by the transformed descriptors with keypoints described by the keypoints described by the descriptors determined at operation 614. At operation 632, device 606 may determine a relative pose between device 604 and device 606 based on the matched keypoints.

Figure 6C:
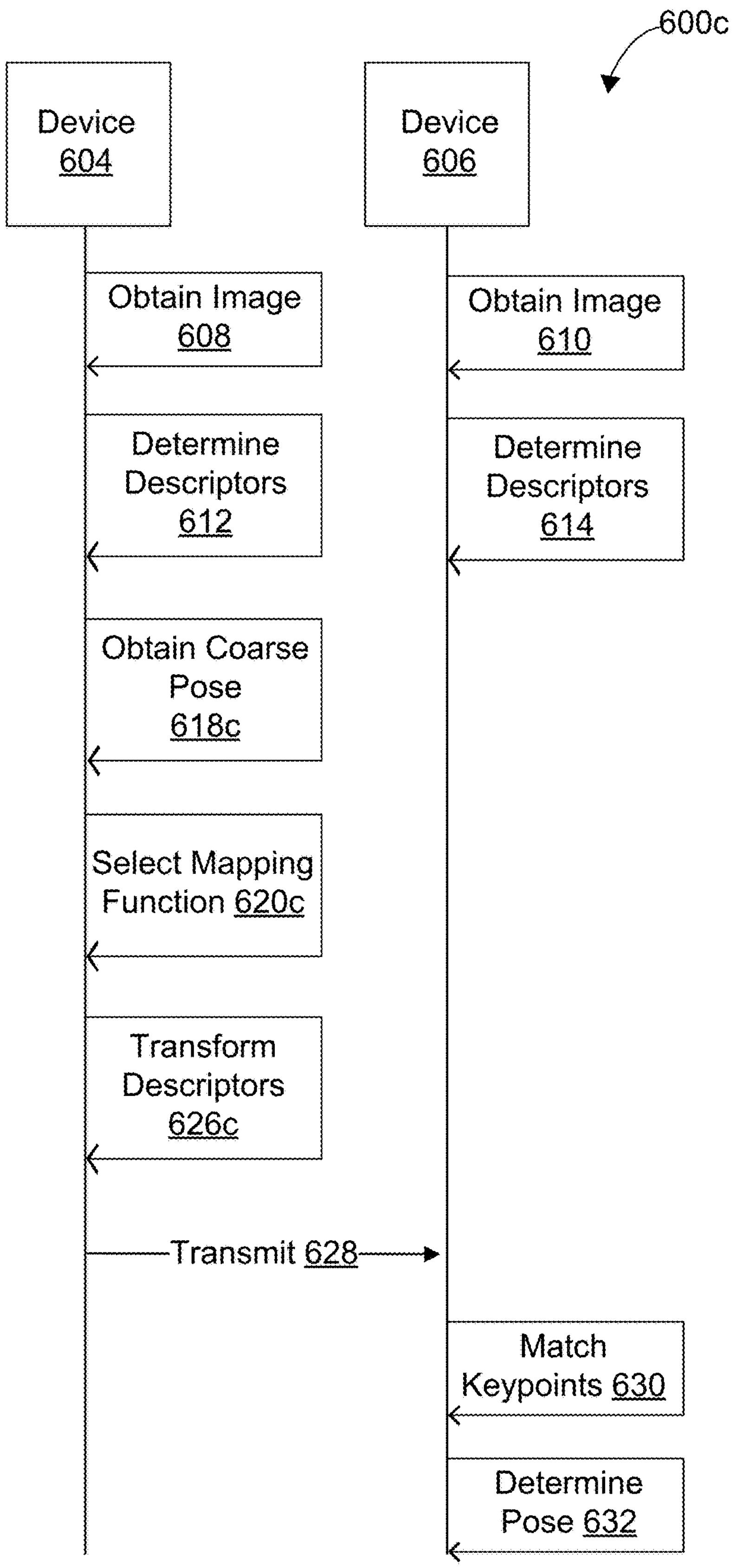
FIG. 6C is a flow diagram illustrating yet another example process for sharing image data and determining matching keypoints, according to various aspects of the present disclosure.

FIG. 6C is a flow diagram illustrating an example process 600*c* for sharing image data and determining matching keypoints, according to various aspects of the present disclosure. In general, process 600*c* includes device 604 obtaining an image and determining descriptors of keypoints of the image. Device 604 may further transform the descriptors using a mapping function and transmit the transformed descriptors to device 606. Device 606 may obtain an image and generate descriptors based on the image. Device 606 may match the keypoints based on the transformed descriptors with keypoints based on the descriptors of the image obtained at device 606. After matching the keypoints, device 606 may determine a relative pose (e.g., between device 604 and device 606) based on the matched keypoints.

At operation 608, device 604 may obtain an image. At operation 610, device 606 may obtain an image. At operation 612, device 604 may determine keypoints and descriptors of the keypoints. At operation 614, device 606 may determine keypoints and descriptors of the keypoints.

In some aspects, at operation 618*c*, device 604 may obtain an indication of a coarse pose between device 604 and device 606. For example, device 502*b* may obtain coarse relative pose 542 from coarse-pose determiner 540. For instance, device 604 may track device 606 in the image captured at operation 608 (and/or other images) and determine the coarse pose using object tracking. As another example, device 606 may track device 604 and may provide an indication of the coarse pose to device 604.

In some aspects, at operation 620*c*, device 604 may select one or more mapping functions to use to transform the descriptors determined at operation 612. For example, device 502*b* may select mapping function 522 from among mapping functions 534. In some aspects, device 604 may select a single mapping function. In other cases, device 604 may select a number of candidate mapping functions. In some aspects, device 604 may select the mapping functions based on the coarse pose obtained at operation 618*c*.

At operation 626*c*, device 604 may transform the descriptors obtained at operation 612 into transformed descriptors, for example, using the mapping function selected at operation 620*c*. For example, device 502*b* may, using mapping function 522, transform descriptors 510 into transformed descriptors 524.

At operation 628, device 604 may transmit the transformed descriptors to device 606. For example, device 502*b* may transmit transformed descriptors 524 to device 512*b*.

At operation 630, device 606 may match keypoints described by the transformed descriptors with keypoints described by the keypoints described by the descriptors determined at operation 614. At operation 632, device 606 may determine a relative pose between device 604 and device 606 based on the matched keypoints.

In some aspects, device 604 may transform the descriptors determined at operation 612 using several mapping functions. (e.g., based on device 604 selecting several candidate mapping functions at operation 620*c* or based on operation 620*c* being omitted). In such cases, device 604 may transmit several transformed descriptors at operation 628. In such cases, at operation 630, device 606 may further attempt to match keypoints described by the number of descriptors received at operation 628 with the keypoints described by the descriptors determined at operation 614. Further device 606 may determine best-matching keypoints. For example, device 606 may determine which of the number of descriptors (derived using the number of mapping functions) match the most of the descriptors determined at operation 614. At operation 632, device 606 may determine the relative pose based on the keypoints that best matched the keypoints described by the descriptors determined at operation 614.

Figure 6D:
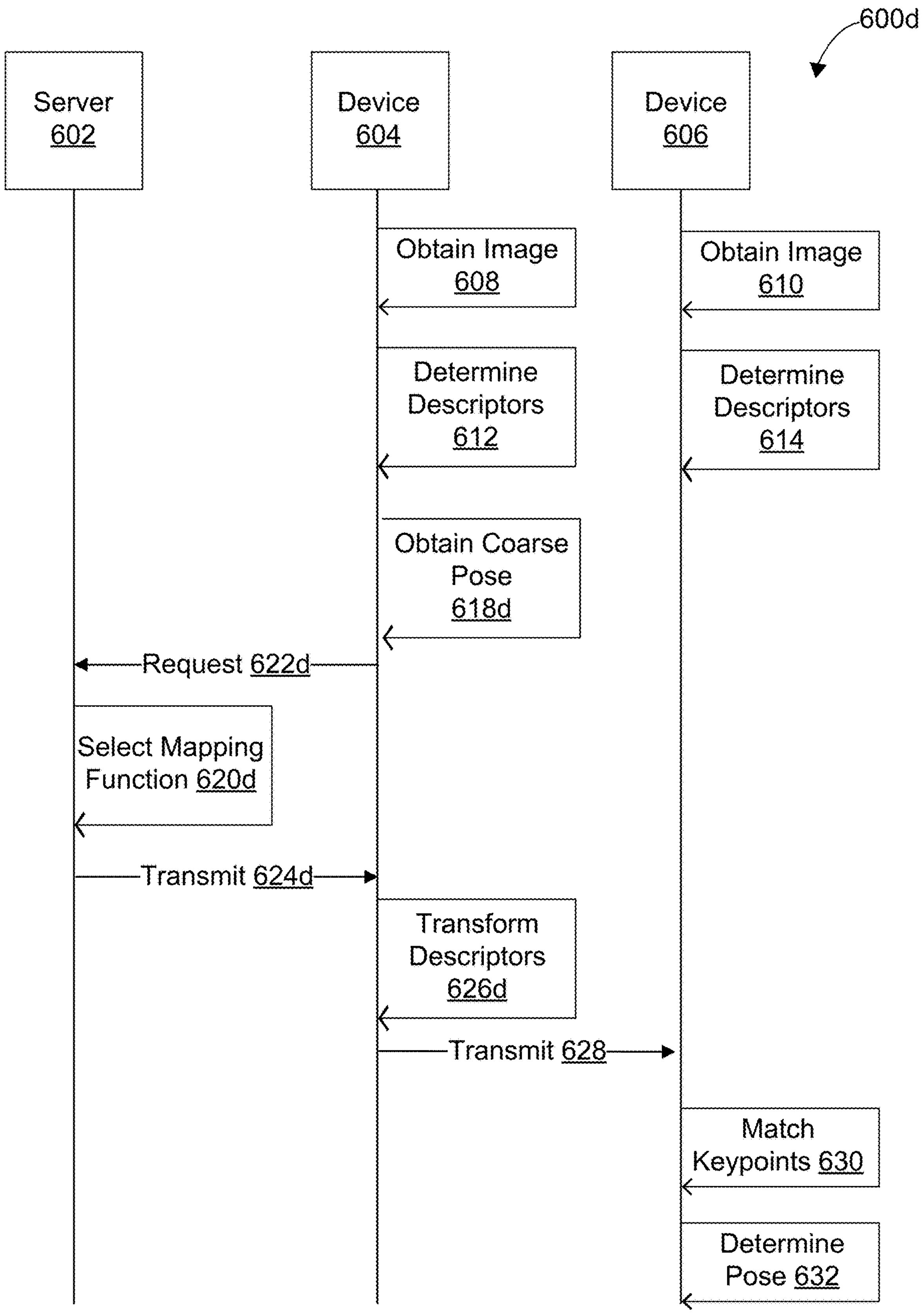
FIG. 6D is a flow diagram illustrating yet another example process for sharing image data and determining matching keypoints, according to various aspects of the present disclosure.

FIG. 6D is a flow diagram illustrating an example process 600*d* for sharing image data and determining matching keypoints, according to various aspects of the present disclosure. In general, process 600*d* includes device 604 obtaining an image and determining descriptors of keypoints of the image.

Device 604 may request a mapping function from server 602 and server 602 may provide the mapping function. Device 604 may transform the descriptors, using the received mapping function and transmit the transformed descriptors to device 606. Device 606 may obtain an image and generate descriptors based on the image. Device 606 may match the keypoints based on the transformed descriptors with keypoints based on the descriptors of the image obtained at device 606. After matching the keypoints, device 606 may determine a relative pose (e.g., between device 604 and device 606) based on the matched keypoints.

At operation 608, device 604 may obtain an image. At operation 610, device 606 may obtain an image. At operation 612, device 604 may determine keypoints and descriptors of the keypoints. At operation 614, device 606 may determine keypoints and descriptors of the keypoints. In some aspects, at operation 618*d*, device 604 may obtain an indication of a coarse pose between device 604 and device 606.

In some aspects, at operation 622*d*, device 604 may request a mapping function from server 602. For example, device 502*b* may request that server 536 transmit one or more of mapping functions 538 to device 502*b*. In some aspects, the request may include an indication of the coarse pose obtained at device 604.

In some aspects, at operation 620*d*, server 602 may select one or more mapping functions to use to transform the descriptors determined by device 604 at operation 612. For example, server 602 may select mapping function 522 from among mapping functions 538. In some aspects, server 602 may select a single mapping function. In other cases, server 602 may select a number of candidate mapping functions. Server 602 may select the one or more mapping functions based on a coarse relative pose between device 604 and device 606 (which may be provided with the request at operation 622*d*). Additionally or alternatively, server 602 may select the one or more mapping functions based on an expected relative pose between device 604 and device 606.

At operation 624*d*, server 602 may transmit the one or more selected mapping functions to device 604. For example, server 536 may transmit mapping function 522 (and/or mapping functions 534) to device 502*b*. In some aspects, server 602 may transmit mapping functions to device 604 without receiving an explicit request for the mapping functions. As such, operation 622*b* may be optional in process 600*b*.

In some aspects, server 602 may transmit several mapping functions (e.g., based on server 602 selecting several candidate mapping functions or based on operation 620*d* being omitted). For example, server 536 may transmit mapping functions 534 to device 502*b*. In some cases, device 604 may select a mapping function to use (e.g., based on a coarse relative pose). For example, device 604 may perform operation 620*c* with regard to the mapping functions received at operation 624*d*.

At operation 626*d*, device 604 may transform the descriptors obtained at operation 612 into transformed descriptors, for example, using the mapping function received at operation 624*d*. For example, device 502*b* may, using mapping function 522, transform descriptors 510 into transformed descriptors 524.

At operation 628, device 604 may transmit the transformed descriptors to device 606. For example, device 502*b* may transmit transformed descriptors 524 to device 512*b*.

At operation 630, device 606 may match keypoints described by the transformed descriptors with keypoints described by the keypoints described by the descriptors determined at operation 614. At operation 632, device 606 may determine a relative pose between device 604 and device 606 based on the matched keypoints.

In some aspects, device 604 may transform the descriptors determined at operation 612 using several mapping functions. (e.g., based on server 602 selecting several candidate mapping functions at operation 620*d* or based on operation 620*d* being omitted). In such cases, device 604 may transmit several transformed descriptors at operation 628. In such cases, at operation 630, device 606 may further attempt to match keypoints described by the number of descriptors received at operation 628 with the keypoints described by the descriptors determined at operation 614. Further device 606 may determine best-matching keypoints. For example, device 606 may determine which of the number of descriptors (derived using the number of mapping functions) match the most of the descriptors determined at operation 614. At operation 632, device 606 may determine the relative pose based on the keypoints that best matched the keypoints described by the descriptors determined at operation 614.

Figure 7:
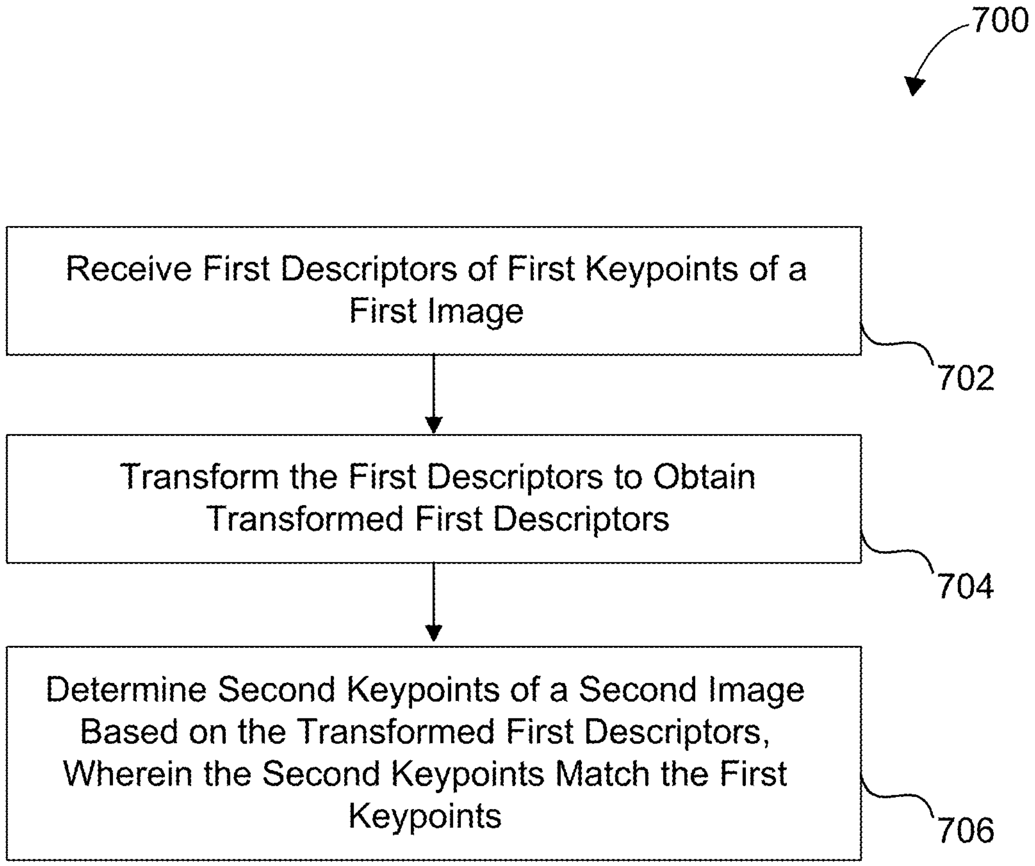
FIG. 7 is a flow diagram illustrating an example process for matching keypoints between images, in accordance with aspects of the present disclosure.

FIG. 7 is a flow diagram illustrating a process 700 for matching keypoints between images, in accordance with aspects of the present disclosure. One or more operations of process 700 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 700. The one or more operations of process 700 may be implemented as software components that are executed and run on one or more processors.

At block 702, a computing device (or one or more components thereof) may receive first descriptors of first keypoints of a first image. For example, device 606 of FIG. 6A may receive descriptors (e.g., at operation 616*a*). The descriptors may be of keypoints of an image, (e.g., the image may be obtained at operation 608 and the descriptors may be determined at operation 612).

In some aspects, the computing device (or one or more components thereof) may be a vehicle or part of a vehicle. For example, device 606 may be an example of device 420, which may be a vehicle. In some aspects, the computing device (or one or more components thereof) may be, or may include, a first apparatus and the first descriptors may received from a second apparatus. For example, device 606 may receive the descriptors from device 604. In some aspects, the second apparatus may be associated with a vehicle or a roadside camera. For example, device 604 may be an example of device 104 of FIG. 1 (e.g., device 604 may be a vehicle). As another example, device 604 may be an example of roadside unit 106 of FIG. 1 (e.g., device 604 may be a roadside unit).

At block 704, the computing device (or one or more components thereof) may transform the first descriptors to obtain transformed first descriptors. For example, device 606 may transform the descriptors at operation 626*a*.

In some aspects, the first descriptors may be transformed using a mapping function. For example, device 606 may transform the descriptors at operation 626*a* using a mapping function selected at operation 620*a*. In some aspects, the mapping function may be, or may include, a neural network trained to transform first-viewing-angle descriptors into second-viewing-angle descriptors. The transformed first descriptors may be viewing-angle descriptors. For example, the mapping function selected at operation 620*a* and used at operation 626*a* may be a trained neural network. The descriptors received at operation 616*a* may be first-viewing angle descriptors, for example, describing keypoints of a scene as viewed from device 604.

In some aspects, the computing device (or one or more components thereof) may select the mapping function from among a plurality of mapping functions. For example, at operation 620*a*, device 606 may select the mapping function to be used at operation 626*a* from among a plurality of mapping functions. In some aspects, the plurality of mapping functions may be stored locally at the apparatus. For example, device 606 may store the plurality of mapping functions. In some aspects, the mapping function may be selected based on a coarse relative pose between a first viewing angle of the first image and a second viewing angle of the second image. for example, at operation 618*a*, device 606 may obtain a coarse relative pose between device 604 and device 606. Device 606 may then select the mapping function (at operation 620*a*) based on the coarse relative pose. In some aspects, the computing device (or one or more components thereof) may determine the coarse relative pose by performing object detection on an image captured from the second viewing angle. For example, device 606 may perform object detection on an image captured by device 604 (and an image captured by device 606) and determine the coarse relative pose based on a detected object.

In some aspects, the mapping function may be received from a server. For example, device 606 of FIG. 6B may receive the mapping function from server 602 of FIG. 6B (e.g., at operation 624*b*). In some aspects, the computing device (or one or more components thereof) may request the mapping function from the server. For example, device 606 may transmit a request (e.g., at operation 622*b*) to server 602 for the mapping function. In some aspects, the mapping function may be requested based on a coarse relative pose between a first viewing angle of the first image and a second viewing angle of the second image. For example, device 606 may determine a coarse relative pose between device 606 and device 604 and request (at operation 622*b*) the mapping function based on the coarse relative pose.

In some aspects, the mapping function may be selected based on an expected relative pose between a first viewing angle of the first image and a second viewing angle of the second image. For example, server 602 may have information regarding an expected relative pose between device 604 and device 606 (e.g., based on a location of device 604, such as in a tunnel). Server 602 may select (at operation 620*b*) the mapping function to transmit to device 606 (at operation 624*b*) based on the expected relative pose. In some aspects, the mapping function may be, or may include, a neural network trained to transform first-viewing-angle descriptors related to a scene into second-viewing-angle descriptors related to the scene. For example, the mapping function determined at operation 620*b* may have been trained specific to the location of device 604.

At block 706, the computing device (or one or more components thereof) may determine second keypoints of a second image based on the transformed first descriptors, wherein the second keypoints match the first keypoints. For example, device 606 of FIG. 6A or FIG. 6B may match the received and transformed descriptors with descriptors determined at operation 614 of an image obtained at operation 610.

In some aspects, the computing device (or one or more components thereof) may determine second descriptors of the second keypoints of the second image, wherein the second keypoints are determined based on a comparison between the transformed first descriptors and the second descriptors. For example, at operation 630, device 606 may determine descriptors of keypoints (e.g., a subset of the keypoints determined at operation 614) that match the descriptors transformed at operation 626*a*.

In some aspects, the computing device (or one or more components thereof) may determine a relative pose between a first viewing angle of the first image and a second viewing angle of the second image based on the first keypoints and the second keypoints. For example, device 606 may determine a relative pose between device 606 and device 604 at operation 632.

Figure 8:
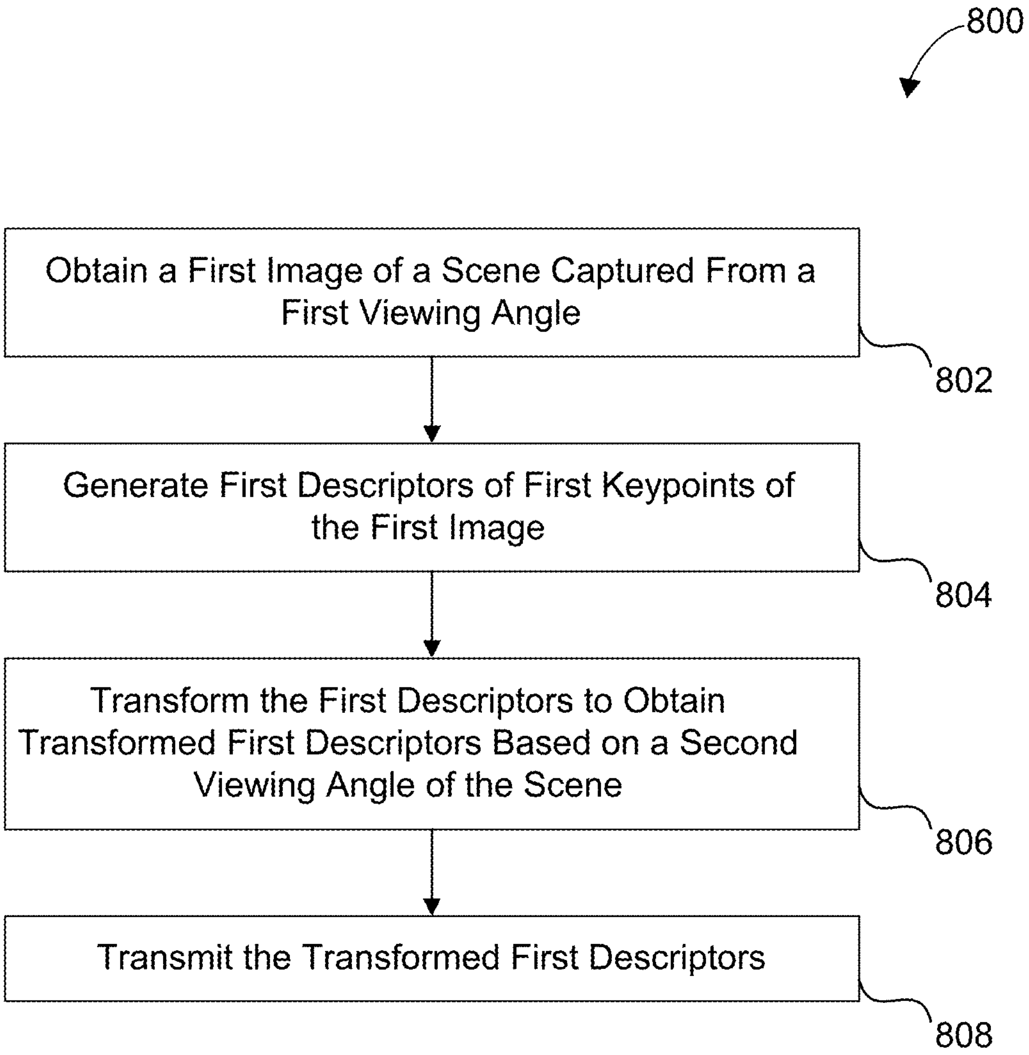
FIG. 8 is a flow diagram illustrating an example process for sharing image data for matching of keypoints between images, in accordance with aspects of the present disclosure.

FIG. 8 is a flow diagram illustrating a process 800 for sharing image data for matching of keypoints between images, in accordance with aspects of the present disclosure. One or more operations of process 800 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 800. The one or more operations of process 800 may be implemented as software components that are executed and run on one or more processors.

At block 802, a computing device (or one or more components thereof) may obtain a first image of a scene captured from a first viewing angle. For example, device 604 of FIG. 6C may obtain a first image of a scene at a first viewing angle at operation 608.

In some aspects, the computing device (or one or more components thereof) may be associated with a vehicle or a roadside camera. For example, device 604 may be an example of device 104 of FIG. 1 (e.g., device 604 may be a vehicle). As another example, device 604 may be an example of roadside unit 106 of FIG. 1 (e.g., device 604 may be a roadside unit).

At block 804, the computing device (or one or more components thereof) may generate first descriptors of first keypoints of the first image. For example, device 604 may determine descriptors, at operation 612, of keypoints of the image obtained at operation 608.

At block 806, the computing device (or one or more components thereof) may transform the first descriptors to obtain transformed first descriptors based on a second viewing angle of the scene. For example, at operation 626*c*, device 604 may transform the descriptors determined at operation 612.

In some aspects, the first descriptors may be transformed using a mapping function. For example, device 604 may transform the descriptors, at operation 626*c*, using a mapping function. In some aspects, the mapping function may be, or may include, a neural network trained to transform first-viewing-angle descriptors into second-viewing-angle descriptors. The transformed first descriptors may be, or may include, viewing-angle descriptors. For example, the mapping function used at operation 626*c* may be, or may include, a trained neural network. The transformed descriptors may correspond to a viewing angle.

In some aspects, the computing device (or one or more components thereof) may select the mapping function from among a plurality of mapping functions. For example, at operation 620*c*, device 604 may select the mapping function to be used at operation 626*c*. In some aspects, the mapping function may be selected based on a coarse relative pose between the first viewing angle and the second viewing angle. For example, at operation 618*c*, device 604 may determine a coarse relative pose between device 604 and device 606. At operation 620*c*, device 604 may select the mapping function to use at operation 626*c* based on the coarse relative pose. In some aspects, the computing device (or one or more components thereof) may determine the coarse relative pose performing object detection on an image captured from the first viewing angle. For example, device 604 may perform object detection on an image captured by device 606 (and device 604) and determine the coarse relative pose based on a detected object.

In some aspects, the mapping function may be received from a server. For example, device 604 of FIG. 6D may receive the mapping function from server 602 of FIG. 6D at operation 624*d*. In some aspects, the computing device (or one or more components thereof) may request the mapping function from the server. For example, at operation 622*d*, device 604 may request the mapping function from server 602. In some aspects, the mapping function may be requested based on a coarse relative pose between a first viewing angle of the first image and the second viewing angle. For example, at operation 618*d*, device 604 may determine a coarse relative pose between device 604 and device 606. At operation 622*d*, device 604 may request the mapping function based on the determined coarse pose.

In some aspects, the mapping function may be selected based on an expected relative pose between a first viewing angle of the first image and a second viewing angle of the second image. For example, server 602 may have information regarding an expected relative pose between device 604 and device 606 (e.g., based on a location of device 604, such as in a tunnel). Server 602 may select (at operation 620*d*) the mapping function to transmit to device 606 (at operation 624*d*) based on the expected relative pose. In some aspects, the mapping function may be, or may include, a neural network trained to transform first-viewing-angle descriptors related to a scene into second-viewing-angle descriptors related to the scene. For example, the mapping function determined at operation 620*d* may have been trained specific to the location of device 604.

At block 808, the computing device (or one or more components thereof) may transmit the transformed first descriptors. For example, at operation 628, device 604 of FIG. 6C or FIG. 6D may transmit the descriptors transformed at operation 626*c*.

In some aspects, the computing device (or one or more components thereof) may transform the first descriptors to obtain a plurality of transformed first descriptors based on a respective plurality of viewing angles of the scene and transmit the plurality of transformed first descriptors. For example, at operation 626*c* (or operation 626*d*), device 604 may transform the descriptors determined at operation 612 according to a plurality of viewing angles. Device 604 may then transmit the plurality of transformed descriptors at operation 628. In some aspects, the first descriptors may be transformed to obtain the plurality of transformed first descriptors using a plurality of mapping functions. For example, at operation 626*c* (or operation 626*d*), device 604 may transform the descriptors using a plurality of mapping functions. In some aspects, each mapping function of the plurality of mapping functions may be, or may include, a neural network trained to transform first-viewing-angle descriptors into second-viewing-angle descriptors. The transformed first descriptors may be viewing-angle descriptors. For example, the plurality of mapping functions used at operation 626*c* (or operation 626*d*) may be, or may include, trained neural networks. Each of the transformed plurality of descriptors may correspond to a respective viewing angle. In some aspects, the computing device (or one or more components thereof) may transmit an identifier indicative of the mapping function. For example, at operation 628, device 604 may transmit an identifier of the mapping function used at operation 626*c* (or operation 626*d*) to transform the descriptors.

Figure 9:
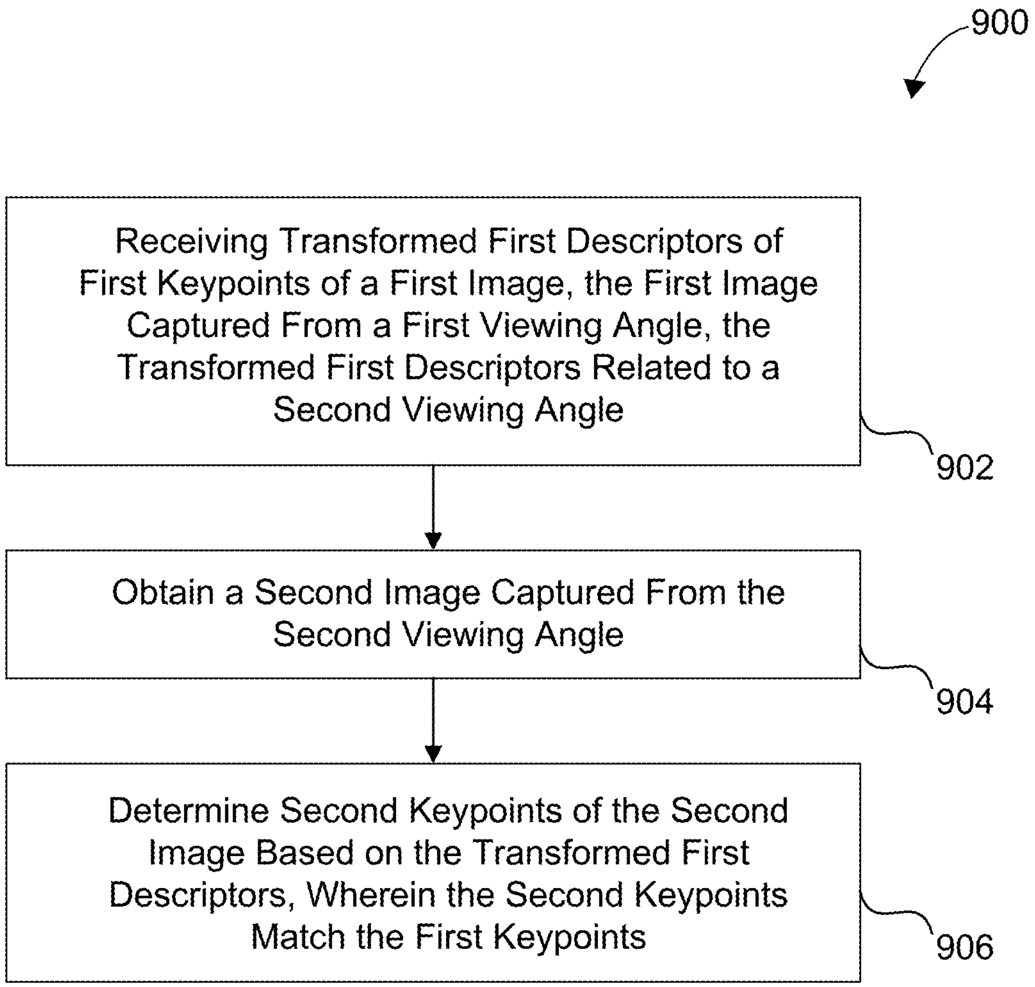
FIG. 9 is a flow diagram illustrating another example process for matching keypoints between images, in accordance with aspects of the present disclosure.

FIG. 9 is a flow diagram illustrating a process 900 for matching keypoints between images, in accordance with aspects of the present disclosure. One or more operations of process 900 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 900. The one or more operations of process 900 may be implemented as software components that are executed and run on one or more processors.

At block 902, a computing device (or one or more components thereof) may receive transformed first descriptors of first keypoints of a first image, the first image captured from a first viewing angle, the transformed first descriptors related to a second viewing angle. For example, device 606 of FIG. 6C or FIG. 6D may receive, at operation 628, transformed descriptors. The transformed descriptors may describe first keypoints of a first image captured (e.g., at operation 608) from a first viewing angle (e.g., by device 604). The transformed descriptors may have been transformed (e.g., at operation 626*c* or operation 626*d*) to relate to a second viewing angle (e.g., the viewing angle of device 606).

In some aspects, the computing device (or one or more components thereof) may be a vehicle or part of a vehicle. For example, device 606 may be an example of device 420, which may be a vehicle. In some aspects, the computing device (or one or more components thereof) may be, or may include, a first apparatus and the first descriptors may received from a second apparatus. For example, device 606 may receive the descriptors from device 604. In some aspects, the second apparatus may be associated with a vehicle or a roadside camera. For example, device 604 may be an example of device 104 of FIG. 1 (e.g., device 604 may be a vehicle). As another example, device 604 may be an example of roadside unit 106 of FIG. 1 (e.g., device 604 may be a roadside unit).

At block 904, the computing device (or one or more components thereof) may obtain a second image captured from the second viewing angle. For example, device 606 may obtain an image at operation 610.

At block 906, the computing device (or one or more components thereof) may determine second keypoints of the second image based on the transformed first descriptors, wherein the second keypoints match the first keypoints. For example, at operation 630, device 606 may determine keypoints (e.g., a subset of the keypoints determined at operation 614) that match the transformed keypoints received at operation 628.

In some aspects, the computing device (or one or more components thereof) may determine a relative pose between a first viewing angle of the first image and a second viewing angle of the second image based on the first keypoints and the second keypoints. For example, at operation 632, device 606 may determine a relative pose between device 604 and device 606 based on the keypoints described by the descriptors received at operation 628 and based on the keypoints described by the descriptors determined at operation 630.

In some aspects, the computing device (or one or more components thereof) may receive a plurality of transformed descriptors including the transformed first descriptors and compare each transformed descriptor of the plurality of transformed descriptors to the second image to determine the transformed first descriptors. For example, at operation 628, device 606 may receive a plurality of transformed descriptors. At operation 630, device 606 may compare the received plurality of transformed descriptors to the descriptors determined at operation 614 to determine which of the plurality of transformed descriptors was transformed with a transformation that best corresponds to the relative viewing angles between device 604 and device 606. Device 606 may use the transformed descriptors that match best to determine the relative pose of device 604 and device 606.

In some aspects, the computing device (or one or more components thereof) may determine second descriptors of the second keypoints of the second image. The second keypoints may be determined based on a comparison between the transformed first descriptors and the second descriptors. For example, at operation 630, device 606 may determine second descriptors (e.g., at subset of the descriptors determined at operation 614) that match the transformed descriptors received at operation 628.

In some examples, as noted previously, the methods described herein (e.g., process 600*a* of FIG. 6A, process 600*b* of FIG. 6B, process 600*c* of FIG. 6C, process 600*d* of FIG. 6D, process 700 of FIG. 7, process 800 of FIG. 8, process 900 of FIG. 9, and/or other methods described herein) can be performed, in whole or in part, by a computing device or apparatus. In one example, one or more of the methods can be performed by system 402 of FIG. 4, system 500*a* of FIG. 5A, system 500*b* of FIG. 5B, or by another system or device. In another example, one or more of the methods (e.g., process 600*a* of FIG. 6A, process 600*b* of FIG. 6B, process 600*c* of FIG. 6C, process 600*d* of FIG. 6D, process 700 of FIG. 7, process 800 of FIG. 8, process 900 of FIG. 9, and/or other methods described herein) can be performed, in whole or in part, by the computing-device architecture 1200 shown in FIG. 12. For instance, a computing device with the computing-device architecture 1200 shown in FIG. 12 can include, or be included in, the components of the system 402 of FIG. 4, system 500*a* of FIG. 5A, system 500*b* of FIG. 5B and can implement the operations of process 600*a* of FIG. 6A. process 600*b* of FIG. 6B. process 600*c* of FIG. 6C, process 600*d* of FIG. 6D, process 700 of FIG. 7, process 800 of FIG. 8, process 900 of FIG. 9, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 600*a* of FIG. 6A, process 600*b* of FIG. 6B, process 600*c* of FIG. 6C, process 600*d* of FIG. 6D, process 700 of FIG. 7, process 800 of FIG. 8, process 900 of FIG. 9, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 600*a* of FIG. 6A, process 600*b* of FIG. 6B, process 600*c* of FIG. 6C, process 600*d* of FIG. 6D, process 700 of FIG. 7, process 800 of FIG. 8, process 900 of FIG. 9, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 10:
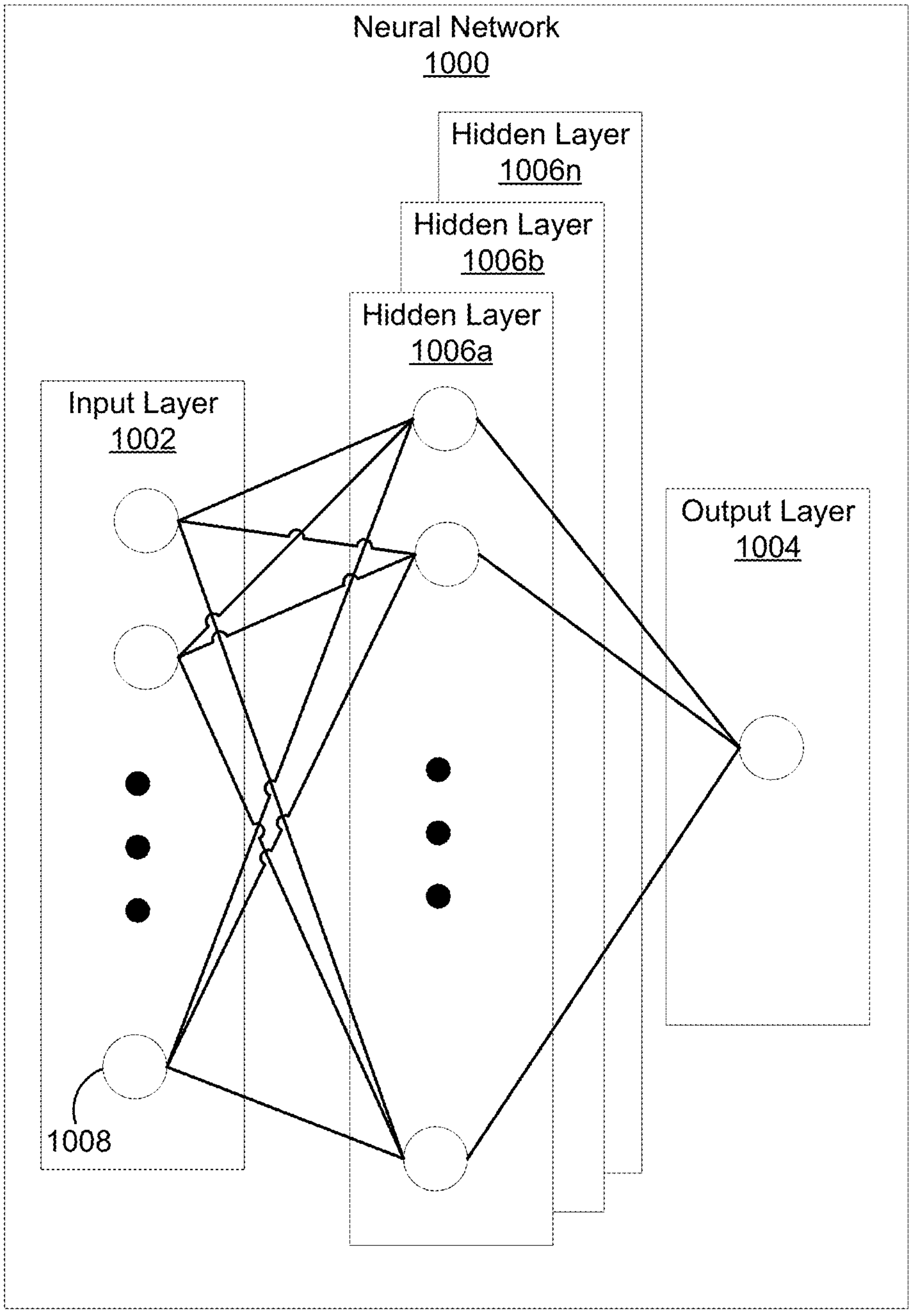
FIG. 10 is a block diagram illustrating an example of a deep learning neural network that can be used to implement a perception module and/or one or more validation modules, according to some aspects of the disclosed technology.

FIG. 10 is an illustrative example of a neural network 1000 (e.g., a deep-learning neural network) that can be used to implement machine-learning based feature segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 1000 may be an example of, or can implement, keypoint identifier 506 of FIG. 5A and FIG. 5B, keypoint identifier 516 of FIG. 5A and FIG. 5B, mapping function 522 of FIG. 5A and FIG. 5B, keypoint matcher 526 of FIG. 5A and FIG. 5B, and/or pose determiner 530 of FIG. 5A and FIG. 5B.

An input layer 1002 includes input data. In one illustrative example, input layer 1002 can include data representing image 504 of FIG. 5A and FIG. 5B, image 514 of FIG. 5A and FIG. 5B, descriptors 510 of FIG. 5A and FIG. 5B, descriptors 520 and transformed descriptors 524 of FIG. 5A and FIG. 5B, and/or matching keypoints 528 of FIG. 5A and FIG. 5B. Neural network 1000 includes multiple hidden layers hidden layers 1006*a*. 1006*b*, through 1006*n*. The hidden layers 1006*a*. 1006*b*, through hidden layer 1006*n* include "n" number of hidden layers, where "n" is an integer greater than or equal to one. The number of hidden layers can be made to include as many layers as needed for the given application. Neural network 1000 further includes an output layer 1004 that provides an output resulting from the processing performed by the hidden layers 1006*a*, 1006*b*, through 1006*n*. In one illustrative example, output layer 1004 can provide keypoints 508 and descriptors 510 of FIG. 5A and FIG. 5B, keypoints 518 and descriptors 520 of FIG. 5A and FIG. 5B, transformed descriptors 524 of FIG. 5A and FIG. 5B, matching keypoints 528 of FIG. 5A and FIG. 5B, and/or relative pose 532 of FIG. 5A and FIG. 5B.

Neural network 1000 may be, or may include, a multi-layer neural network of interconnected nodes. Each node can represent a piece of information. Information associated with the nodes is shared among the different layers and each layer retains information as information is processed. In some cases, neural network 1000 can include a feed-forward network, in which case there are no feedback connections where outputs of the network are fed back into itself. In some cases, neural network 1000 can include a recurrent neural network, which can have loops that allow information to be carried across nodes while reading in input.

Information can be exchanged between nodes through node-to-node interconnections between the various layers. Nodes of input layer 1002 can activate a set of nodes in the first hidden layer 1006*a*. For example, as shown, each of the input nodes of input layer 1002 is connected to each of the nodes of the first hidden layer 1006*a*. The nodes of first hidden layer 1006*a* can transform the information of each input node by applying activation functions to the input node information. The information derived from the transformation can then be passed to and can activate the nodes of the next hidden layer 1006*b*, which can perform their own designated functions. Example functions include convolutional, up-sampling, data transformation, and/or any other suitable functions. The output of the hidden layer 1006*b* can then activate nodes of the next hidden layer, and so on. The output of the last hidden layer 1006*n* can activate one or more nodes of the output layer 1004, at which an output is provided. In some cases, while nodes (e.g., node 1008) in neural network 1000 are shown as having multiple output lines, a node has a single output and all lines shown as being output from a node represent the same output value.

In some cases, each node or interconnection between nodes can have a weight that is a set of parameters derived from the training of neural network 1000. Once neural network 1000 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 1000 to be adaptive to inputs and able to learn as more and more data is processed.

Neural network 1000 may be pre-trained to process the features from the data in the input layer 1002 using the different hidden layers 1006*a*, 1006*b*, through 1006*n* in order to provide the output through the output layer 1004. In an example in which neural network 1000 is used to identify features in images, neural network 1000 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 1000 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until neural network 1000 is trained well enough so that the weights of the layers are accurately tuned.

For the example of identifying objects in images, the forward pass can include passing a training image through neural network 1000. The weights are initially randomized before neural network 1000 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 1000, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 1000 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 1000 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta\frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

Neural network 1000 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 1000 can include any other deep network other than a CNN, such as an autoencoder, a deep belief nets (DBNs), a Recurrent Neural Networks (RNNs), among others.

Figure 11:
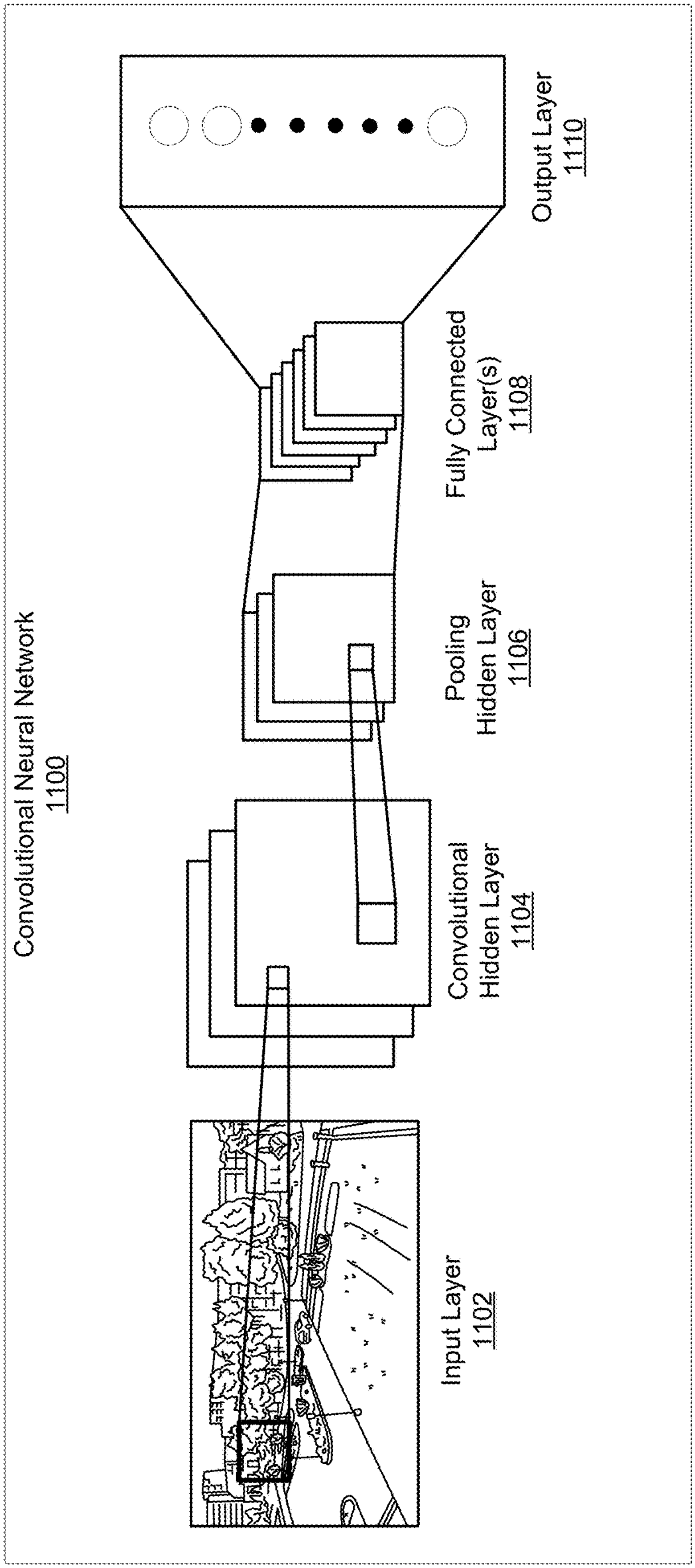
FIG. 11 is a block diagram illustrating an example of a convolutional neural network (CNN), according to various aspects of the present disclosure.

FIG. 11 is an illustrative example of a convolutional neural network (CNN) 1100. The input layer 1102 of the CNN 1100 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1104, an optional non-linear activation layer, a pooling hidden layer 1106, and fully connected layer 1108 (which fully connected layer 1108 can be hidden) to get an output at the output layer 1110. While only one of each hidden layer is shown in FIG. 11, one of ordinary skill will appreciate that multiple convolutional hidden layers, non-linear layers, pooling hidden layers, and/or fully connected layers can be included in the CNN 1100. As previously described, the output can indicate a single class of an object or can include a probability of classes that best describe the object in the image.

The first layer of the CNN 1100 can be the convolutional hidden layer 1104. The convolutional hidden layer 1104 can analyze image data of the input layer 1102. Each node of the convolutional hidden layer 1104 is connected to a region of nodes (pixels) of the input image called a receptive field. The convolutional hidden layer 1104 can be considered as one or more filters (each filter corresponding to a different activation or feature map), with each convolutional iteration of a filter being a node or neuron of the convolutional hidden layer 1104. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1104. Each connection between a node and a receptive field for that node learns a weight and, in some cases, an overall bias such that each node learns to analyze its particular local receptive field in the input image. Each node of the convolutional hidden layer 1104 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1104 is due to each node of the convolutional layer being applied to its corresponding receptive field. For example, a filter of the convolutional hidden layer 1104 can begin in the top-left corner of the input image array and can convolve around the input image. As noted above, each convolutional iteration of the filter can be considered a node or neuron of the convolutional hidden layer 1104. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1104. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1104.

The mapping from the input layer to the convolutional hidden layer 1104 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1104 can include several activation maps in order to identify multiple features in an image. The example shown in FIG. 11 includes three activation maps. Using three activation maps, the convolutional hidden layer 1104 can detect three different kinds of features, with each feature being detectable across the entire image.

In some examples, a non-linear hidden layer can be applied after the convolutional hidden layer 1104. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 1100 without affecting the receptive fields of the convolutional hidden layer 1104.

The pooling hidden layer 1106 can be applied after the convolutional hidden layer 1104 (and after the non-linear hidden layer when used). The pooling hidden layer 1106 is used to simplify the information in the output from the convolutional hidden layer 1104. For example, the pooling hidden layer 1106 can take each activation map output from the convolutional hidden layer 1104 and generates a condensed activation map (or feature map) using a pooling function. Max-pooling is one example of a function performed by a pooling hidden layer. Other forms of pooling functions be used by the pooling hidden layer 1106, such as average pooling. L2-norm pooling, or other suitable pooling functions. A pooling function (e.g., a max-pooling filter, an L2-norm filter, or other suitable pooling filter) is applied to each activation map included in the convolutional hidden layer 1104. In the example shown in FIG. 11, three pooling filters are used for the three activation maps in the convolutional hidden layer 1104.

In some examples, max-pooling can be used by applying a max-pooling filter (e.g., having a size of 2×2) with a stride (e.g., equal to a dimension of the filter, such as a stride of 2) to an activation map output from the convolutional hidden layer 1104. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1104 having a dimension of 24×24 nodes, the output from the pooling hidden layer 1106 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1100.

The final layer of connections in the network is a fully-connected layer that connects every node from the pooling hidden layer 1106 to every one of the output nodes in the output layer 1110. Using the example above, the input layer includes 28×28 nodes encoding the pixel intensities of the input image, the convolutional hidden layer 1104 includes 3×24×24 hidden feature nodes based on application of a 5×5 local receptive field (for the filters) to three activation maps, and the pooling hidden layer 1106 includes a layer of 3×12×12 hidden feature nodes based on application of max-pooling filter to 2×2 regions across each of the three feature maps. Extending this example, the output layer 1110 can include ten output nodes. In such an example, every node of the 3x 12×12 pooling hidden layer 1106 is connected to every node of the output layer 1110.

The fully connected layer 1108 can obtain the output of the previous pooling hidden layer 1106 (which should represent the activation maps of high-level features) and determines the features that most correlate to a particular class. For example, the fully connected layer 1108 can determine the high-level features that most strongly correlate to a particular class and can include weights (nodes) for the high-level features. A product can be computed between the weights of the fully connected layer 1108 and the pooling hidden layer 1106 to obtain probabilities for the different classes. For example, if the CNN 1100 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1110 can include an M-dimensional vector (in the prior example, M=10). M indicates the number of classes that the CNN 1100 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 12:
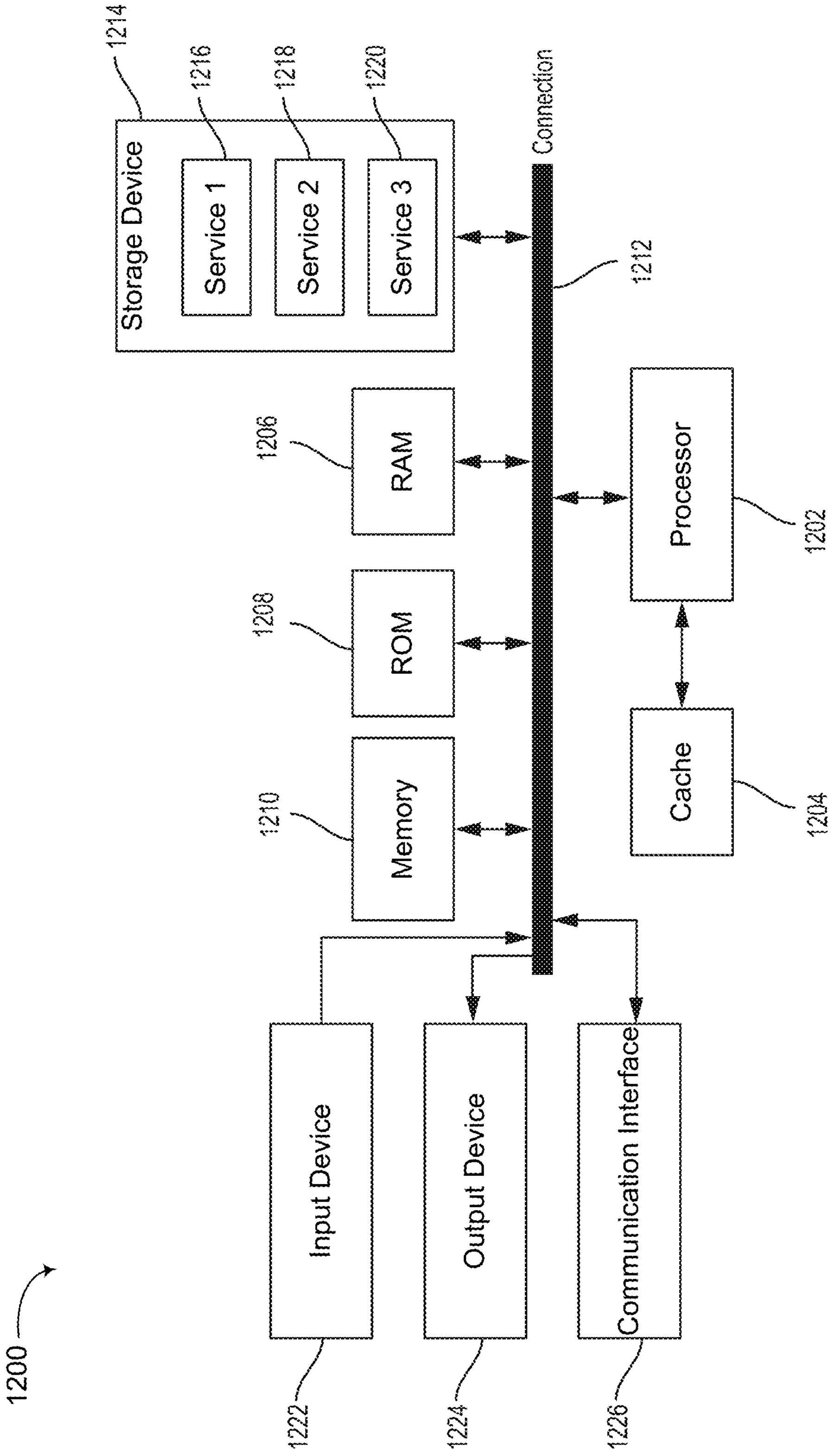
FIG. 12 is a block diagram illustrating an example computing-device architecture of an example computing device which can implement the various techniques described herein.

FIG. 12 illustrates an example computing-device architecture 1200 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1200 may include, implement, or be included in any or all of device 502*a* of FIG. 5A, device 512*a* of FIG. 5A, device 502*b* of FIG. 5B, and/or device 512*b* of FIG. 5B. Additionally or alternatively, computing-device architecture 1200 may be configured to perform process 600*a* of FIG. 6A, process 600*b* of FIG. 6B, process 600*c* of FIG. 6C, process 600*d* of FIG. 6D, process 700 of FIG. 7, process 800 of FIG. 8, process 900 of FIG. 9, and/or other process described herein.

The components of computing-device architecture 1200 are shown in electrical communication with each other using connection 1212, such as a bus. The example computing-device architecture 1200 includes a processing unit (CPU or processor) 1202 and computing device connection 1212 that couples various computing device components including computing device memory 1210, such as read only memory (ROM) 1208 and random-access memory (RAM) 1206, to processor 1202.

Computing-device architecture 1200 can include a cache of high-speed memory connected directly with, in close proximity to, or integrated as part of processor 1202. Computing-device architecture 1200 can copy data from memory 1210 and/or the storage device 1214 to cache 1204 for quick access by processor 1202. In this way, the cache can provide a performance boost that avoids processor 1202 delays while waiting for data. These and other modules can control or be configured to control processor 1202 to perform various actions. Other computing device memory 1210 may be available for use as well. Memory 1210 can include multiple different types of memory with different performance characteristics. Processor 1202 can include any general-purpose processor and a hardware or software service, such as service 1 1216, service 2 1218, and service 3 1220 stored in storage device 1214, configured to control processor 1202 as well as a special-purpose processor where software instructions are incorporated into the processor design. Processor 1202 may be a self-contained system, containing multiple cores or processors, a bus, memory controller, cache, etc. A multi-core processor may be symmetric or asymmetric.

To enable user interaction with the computing-device architecture 1200, input device 1222 can represent any number of input mechanisms, such as a microphone for speech, a touch-sensitive screen for gesture or graphical input, keyboard, mouse, motion input, speech and so forth. Output device 1224 can also be one or more of a number of output mechanisms known to those of skill in the art, such as a display, projector, television, speaker device, etc. In some instances, multimodal computing devices can enable a user to provide multiple types of input to communicate with computing-device architecture 1200. Communication interface 1226 can generally govern and manage the user input and computing device output. There is no restriction on operating on any particular hardware arrangement and therefore the basic features here may easily be substituted for improved hardware or firmware arrangements as they are developed.

Storage device 1214 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1206, read only memory (ROM) 1208, and hybrids thereof. Storage device 1214 can include services 1216, 1218, and 1220 for controlling processor 1202. Other hardware or software modules are contemplated. Storage device 1214 can be connected to the computing device connection 1212. In one aspect, a hardware module that performs a particular function can include the software component stored in a computer-readable medium in connection with the necessary hardware components, such as processor 1202, connection 1212, output device 1224, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("S") and greater than or equal to (">") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more"

of a set does not limit the set to the items listed in the set. For example, claim language reciting "at least one of A and B" or "at least one of A or B" may mean A. B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X. Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for matching keypoints between images, the apparatus comprising: at least one memory; and at least one processor coupled to the at least one memory and configured to: receive first descriptors of first keypoints of a first image; transform the first descriptors to obtain transformed first descriptors; and determine second keypoints of a second image based on the transformed first descriptors, wherein the second keypoints match the first keypoints.

Aspect 2. The apparatus of aspect 1, wherein the at least one processor is further configured to determine a relative pose between a first viewing angle of the first image and a second viewing angle of the second image based on the first keypoints and the second keypoints.

Aspect 3. The apparatus of any one of aspects 1 or 2, wherein the first descriptors are transformed using a mapping function.

Aspect 4. The apparatus of aspect 3, wherein the mapping function comprises a neural network trained to transform first-viewing-angle descriptors into second-viewing-angle descriptors, and wherein the transformed first descriptors are viewing-angle descriptors.

Aspect 5. The apparatus of any one of aspects 3 or 4, wherein the at least one processor is further configured to select the mapping function from among a plurality of mapping functions.

Aspect 6. The apparatus of aspect 5, wherein the plurality of mapping functions are stored locally at the apparatus.

Aspect 7. The apparatus of any one of aspects 5 or 6, wherein the mapping function is selected based on a coarse relative pose between a first viewing angle of the first image and a second viewing angle of the second image.

Aspect 8. The apparatus of aspect 7, wherein the at least one processor is further configured to determine the coarse relative pose by performing object detection on an image captured from the second viewing angle.

Aspect 9. The apparatus of any one of aspects 3 to 8, wherein the mapping function is received from a server.

Aspect 10. The apparatus of aspect 9, wherein the at least one processor is further configured to request the mapping function from the server.

Aspect 11. The apparatus of aspect 10, wherein the mapping function is requested based on a coarse relative pose between a first viewing angle of the first image and a second viewing angle of the second image.

Aspect 12. The apparatus of any one of aspects 9 to 11, wherein the mapping function is selected based on an expected relative pose between a first viewing angle of the first image and a second viewing angle of the second image.

Aspect 13. The apparatus of any one of aspects 9 to 12, wherein the mapping function comprises a neural network trained to transform first-viewing-angle descriptors related to a scene into second-viewing-angle descriptors related to the scene.

Aspect 14. The apparatus of any one of aspects 1 to 13, wherein the at least one processor is further configured to determine second descriptors of the second keypoints of the second image, wherein the second keypoints are determined based on a comparison between the transformed first descriptors and the second descriptors.

Aspect 15. The apparatus of any one of aspects 1 to 14, wherein the apparatus is a vehicle.

Aspect 16. The apparatus of any one of aspects 1 to 15, wherein the apparatus is part of a vehicle.

Aspect 17. The apparatus of any one of aspects 1 to 16, wherein the apparatus comprises a first apparatus and wherein the first descriptors are received from a second apparatus.

Aspect 18. The apparatus of aspect 17, wherein the second apparatus is associated with a vehicle or a roadside camera.

Aspect 19. An apparatus for sharing image data for matching of keypoints between images, the apparatus comprising: at least one memory; and at least one processor coupled to the at least one memory and configured to: obtain a first image of a scene captured from a first viewing angle; generate first descriptors of first keypoints of the first image; transform the first descriptors to obtain transformed first descriptors based on a second viewing angle of the scene; and transmit the transformed first descriptors.

Aspect 20. The apparatus of aspect 19, wherein the at least one processor is further configured to: transform the first descriptors to obtain a plurality of transformed first descriptors based on a respective plurality of viewing angles of the scene; and transmit the plurality of transformed first descriptors.

Aspect 21. The apparatus of aspect 20, wherein the first descriptors are transformed to obtain the plurality of transformed first descriptors using a plurality of mapping functions.

Aspect 22. The apparatus of aspect 21, wherein each mapping function of the plurality of mapping functions comprises a neural network trained to transform first-viewing-angle descriptors into second-viewing-angle descriptors, and wherein the transformed first descriptors are viewing-angle descriptors.

Aspect 23. The apparatus of any one of aspects 19 to 22, wherein the first descriptors are transformed using a mapping function.

Aspect 24. The apparatus of aspect 23, wherein the mapping function comprises a neural network trained to transform first-viewing-angle descriptors into second-viewing-angle descriptors, and wherein the transformed first descriptors are viewing-angle descriptors.

Aspect 25. The apparatus of any one of aspects 23 or 24, wherein the at least one processor is further configured to select the mapping function from among a plurality of mapping functions.

Aspect 26. The apparatus of aspect 25, wherein the mapping function is selected based on a coarse relative pose between the first viewing angle and the second viewing angle.

Aspect 27. The apparatus of aspect 26, wherein the at least one processor is further configured to determine the coarse relative pose performing object detection on an image captured from the first viewing angle.

Aspect 28. The apparatus of any one of aspects 25 to 27, wherein the at least one processor is further configured to transmit an identifier indicative of the mapping function.

Aspect 29. The apparatus of any one of aspects 23 to 28, wherein the mapping function is received from a server.

Aspect 30. The apparatus of aspect 29, wherein the at least one processor is further configured to request the mapping function from the server.

Aspect 31. The apparatus of aspect 30, wherein the mapping function is requested based on a coarse relative pose between a first viewing angle of the first image and the second viewing angle.

Aspect 32. The apparatus of any one of aspects 29 to 31, wherein the mapping function is selected based on an expected relative pose between a first viewing angle of the first image and the second viewing angle.

Aspect 33. The apparatus of any one of aspects 19 to 32, wherein the apparatus is associated with a vehicle or a roadside camera.

Aspect 34. An apparatus for matching keypoints between images, the apparatus comprising: at least one memory; and at least one processor coupled to the at least one memory and configured to: receive transformed first descriptors of first keypoints of a first image, the first image captured from a first viewing angle, the transformed first descriptors related to a second viewing angle; obtain a second image captured from the second viewing angle; and determine second keypoints of the second image based on the transformed first descriptors, wherein the second keypoints match the first keypoints.

Aspect 35. The apparatus of aspect 34, wherein the at least one processor is further configured to determine a relative pose between a first viewing angle of the first image and a second viewing angle of the second image based on the first keypoints and the second keypoints.

Aspect 36. The apparatus of any one of aspects 34 or 35, wherein the at least one processor is further configured to: receive a plurality of transformed descriptors including the transformed first descriptors; and compare each transformed descriptor of the plurality of transformed descriptors to the second image to determine the transformed first descriptors.

Aspect 37. The apparatus of any one of aspects 34 to 36, wherein the at least one processor is further configured to determine second descriptors of the second keypoints of the second image; wherein the second keypoints are determined based on a comparison between the transformed first descriptors and the second descriptors.

Aspect 38. The apparatus of any one of aspects 34 to 37, wherein the apparatus is part of a vehicle.

Aspect 39. The apparatus of any one of aspects 34 to 38, wherein the apparatus comprises a first apparatus and wherein the transformed first descriptors are received from a second apparatus.

Aspect 40. The apparatus of aspect 39, wherein the second apparatus is associated with a vehicle or a roadside camera.

Aspect 41. A method for matching keypoints between images, the method comprising: receiving first descriptors of first keypoints of a first image; transforming the first descriptors to obtain transformed first descriptors; and determining second keypoints of a second image based on the transformed first descriptors, wherein the second keypoints match the first keypoints.

Aspect 42. The method of aspect 41, further comprising determining a relative pose between a first viewing angle of the first image and a second viewing angle of the second image based on the first keypoints and the second keypoints.

Aspect 43. The method of any one of aspects 41 or 42, wherein the first descriptors are transformed using a mapping function.

Aspect 44. The method of aspects 43, wherein the mapping function comprises a neural network trained to transform first-viewing-angle descriptors into second-viewing-angle descriptors, and wherein the transformed first descriptors are viewing-angle descriptors.

Aspect 45. The method of any one of aspects 43 or 44, further comprising selecting the mapping function from among a plurality of mapping functions.

Aspect 46. The method of aspect 45, wherein the plurality of mapping functions are stored locally at a computing device that transformed the first descriptors.

Aspect 47. The method of any one of aspects 45 or 46, wherein the mapping function is selected based on a coarse relative pose between a first viewing angle of the first image and a second viewing angle of the second image.

Aspect 48. The method of aspect 47, further comprising determining the coarse relative pose by performing object detection on an image captured from the second viewing angle.

Aspect 49. The method of any one of aspects 43 to 48, wherein the mapping function is received from a server.

Aspect 50. The method of aspect 49, further comprising requesting the mapping function from the server.

Aspect 51. The method of aspect 50, wherein the mapping function is requested based on a coarse relative pose between a first viewing angle of the first image and a second viewing angle of the second image.

Aspect 52. The method of any one of aspects 49 to 51, wherein the mapping function is selected based on an expected relative pose between a first viewing angle of the first image and a second viewing angle of the second image.

Aspect 53. The method of any one of aspects 49 to 52, wherein the mapping function comprises a neural network trained to transform first-viewing-angle descriptors related to a scene into second-viewing-angle descriptors related to the scene.

Aspect 54. The method of any one of aspects 41 to 53, further comprising determining second descriptors of the second keypoints of the second image, wherein the second keypoints are determined based on a comparison between the transformed first descriptors and the second descriptors.

Aspect 55. The method of any one of aspects 41 to 54, wherein the method is performed by a computing device of a vehicle.

Aspect 56. The method of any one of aspects 41 to 55, wherein the method is performed by a first computing device and wherein the first descriptors are received from a second computing device.

Aspect 57. The method of aspects 56, wherein the second computing device is associated with a vehicle or a roadside camera.

Aspect 58. A method for sharing image data for matching of keypoints between images, the method comprising: obtaining a first image of a scene captured from a first viewing angle; generating first descriptors of first keypoints of the first image; transforming the first descriptors to obtain transformed first descriptors based on a second viewing angle of the scene; and transmitting the transformed first descriptors.

Aspect 59. The method of aspect 58, further comprising: transforming the first descriptors to obtain a plurality of transformed first descriptors based on a respective plurality of viewing angles of the scene; and transmitting the plurality of transformed first descriptors.

Aspect 60. The method of aspect 59, wherein the first descriptors are transformed to obtain the plurality of transformed first descriptors using a plurality of mapping functions.

Aspect 61. The method of aspect 60, wherein each mapping function of the plurality of mapping functions comprises a neural network trained to transform first-viewing-angle descriptors into second-viewing-angle descriptors, and wherein the transformed first descriptors are viewing-angle descriptors.

Aspect 62. The method of any one of aspects 58 to 61, wherein the first descriptors are transformed using a mapping function.

Aspect 63. The method of aspect 62, wherein the mapping function comprises a neural network trained to transform first-viewing-angle descriptors into second-viewing-angle descriptors, and wherein the transformed first descriptors are viewing-angle descriptors.

Aspect 64. The method of any one of aspects 62 or 63, further comprising selecting the mapping function from among a plurality of mapping functions.

Aspect 65. The method of aspect 64, wherein the mapping function is selected based on a coarse relative pose between the first viewing angle and the second viewing angle.

Aspect 66. The method of aspect 65, further comprising determining the coarse relative pose performing object detection on an image captured from the first viewing angle.

Aspect 67. The method of any one of aspects 64 to 66, further comprising transmitting an identifier indicative of the mapping function.

Aspect 68. The method of any one of aspects 62 to 67, wherein the mapping function is received from a server.

Aspect 69. The method of aspect 68, further comprising requesting the mapping function from the server.

Aspect 70. The method of aspect 69, wherein the mapping function is requested based on a coarse relative pose between a first viewing angle of the first image and the second viewing angle.

Aspect 71. The method of any one of aspects 60 to 70, wherein the mapping function is selected based on an expected relative pose between a first viewing angle of the first image and the second viewing angle.

Aspect 72. The method of any one of aspects 58 to 71, wherein: the first image is captured by a first device; the first descriptors are generated by the first device; the first descriptors are transformed by the first device; and the transformed first descriptors are transmitted by the first device.

Aspect 73. The method of aspect 72, wherein the first device is associated with a vehicle or a roadside camera.

Aspect 74. The method of any one of aspects 72 or 73, further comprising, at a second device: receiving the transformed first descriptors; obtaining a second image; and determining second keypoints of the second image based on the transformed first descriptors, wherein the second keypoints match the first keypoints.

Aspect 75. The method of aspect 74, further comprising determining, at the second device, a relative pose between a first viewing angle of the first image and a second viewing angle of the second image based on the first keypoints and the second keypoints.

Aspect 76. A method for matching keypoints between images, the method comprising: receiving transformed first descriptors of first keypoints of a first image, the first image captured from a first viewing angle, the transformed first descriptors related to a second viewing angle; obtaining a second image captured from the second viewing angle; and determining second keypoints of the second image based on the transformed first descriptors, wherein the second keypoints match the first keypoints.

Aspect 77. The method of aspect 76, further comprising determining a relative pose between a first viewing angle of the first image and a second viewing angle of the second image based on the first keypoints and the second keypoints.

Aspect 78. The method of any one of aspects 76 or 77, further comprising: receiving a plurality of transformed descriptors including the transformed first descriptors; and comparing each transformed descriptor of the plurality of transformed descriptors to the second image to determine the transformed first descriptors.

Aspect 79. The method of any one of aspects 76 to 78, further comprising determining second descriptors of the second keypoints of the second image; wherein the second keypoints are determined based on a comparison between the transformed first descriptors and the second descriptors.

Aspect 80. The method of any one of aspects 76 to 79, wherein the method is performed by a computing device of a vehicle.

Aspect 81. The method of any one of aspects 76 to 80, wherein the method is performed by a first computing device and wherein the transformed first descriptors are received from a second computing device.

Aspect 82. The method of aspect 81, wherein the second computing device is associated with a vehicle or a roadside camera.

Aspect 83. A non-transitory computer-readable storage medium having stored thereon instructions that, when executed by at least one processor, cause the at least one processor to perform operations according to any of aspects 41 to 82.

Aspect 84. An apparatus for providing virtual content for display, the apparatus comprising one or more means for perform operations according to any of aspects 41 to 82.

What is claimed is:

1. An apparatus for matching keypoints between images, the apparatus comprising:
- at least one memory; and
- at least one processor coupled to the at least one memory and configured to:
  - obtain first descriptors of first keypoints of a first image, wherein the first image represents a scene as captured from a first viewing angle;
  - obtain second descriptors of second keypoints of a second image, wherein the second image represents the scene as captured from a second viewing angle;
  - transform the first descriptors to obtain transformed first descriptors, wherein the transformed first descriptors describe the first keypoints as if captured from a third viewing angle; and
  - identify matching keypoints from among the second keypoints that match the first keypoints based on the second descriptors and the transformed first descriptors.

2. The apparatus of claim 1, wherein the at least one processor is further configured to determine a relative pose between the first viewing angle and the second viewing angle based on the first keypoints and the second keypoints.

3. The apparatus of claim 1, wherein the at least one processor is configured to transform the first descriptors using a mapping function.

4. The apparatus of claim 3, wherein the mapping function comprises a neural network trained to transform first-viewing-angle descriptors into second-viewing-angle descriptors.

5. The apparatus of claim 3, wherein the at least one processor is further configured to select the mapping function from among a plurality of mapping functions.

6. The apparatus of claim 5, wherein the plurality of mapping functions are stored locally at the apparatus.

7. The apparatus of claim 5, wherein the mapping function is selected based on a coarse relative pose between the first viewing angle and the second viewing angle.

8. The apparatus of claim 3, wherein the mapping function is received from a server.

9. The apparatus of claim 8, wherein the at least one processor is further configured to request the mapping function from the server.

10. The apparatus of claim 9, wherein the at least one processor is configured to request the mapping function is requested based on a coarse relative pose between a first viewing angle of the first image and a second viewing angle of the second image.

11. The apparatus of claim 8, wherein the mapping function is selected based on an expected relative pose between the first viewing angle and the second viewing angle.

12. The apparatus of claim 1, wherein the apparatus is part of a vehicle.

13. An apparatus for sharing image data for matching of keypoints between images, the apparatus comprising:

at least one memory; and at least one processor coupled to the at least one memory and configured to:

obtain a first image of a scene captured from a first viewing angle;

generate first descriptors of first keypoints of the first image;

transform the first descriptors to obtain transformed first descriptors based on a second viewing angle of the scene, wherein the transformed first descriptors describe the first keypoints as if captured from a second viewing angle; and transmit the transformed first descriptors.

14. The apparatus of claim 13, wherein the at least one processor is further configured to:

transform the first descriptors to obtain a plurality of transformed first descriptors based on a respective plurality of viewing angles of the scene; and transmit the plurality of transformed first descriptors.

15. The apparatus of claim 14, wherein the at least one processor is configured to transform the first descriptors to obtain the plurality of transformed first descriptors using a plurality of mapping functions.

16. The apparatus of claim 15, wherein each mapping function of the plurality of mapping functions comprises a neural network trained to transform first-viewing-angle descriptors into second-viewing-angle descriptors.

17. The apparatus of claim 13, wherein the at least one processor is configured to transform the first descriptors using a mapping function.

18. The apparatus of claim 17, wherein the mapping function comprises a neural network trained to transform first-viewing-angle descriptors into second-viewing-angle descriptors.

19. The apparatus of claim 17, wherein the at least one processor is further configured to select the mapping function from among a plurality of mapping functions.

20. The apparatus of claim 19, wherein the at least one processor is configured to select the mapping function based on a coarse relative pose between the first viewing angle and a third viewing angle.

21. The apparatus of claim 17, wherein the mapping function is received from a server.

22. The apparatus of claim 21, wherein the at least one processor is further configured to request the mapping function from the server.

23. The apparatus of claim 22, wherein the at least one processor is configured to request the mapping function based on a coarse relative pose between a first viewing angle of the first image and a third viewing angle.

24. The apparatus of claim 21, wherein the mapping function is selected based on an expected relative pose between a first viewing angle of the first image and a third viewing angle.

25. The apparatus of claim 13, wherein the apparatus is associated with a vehicle or a roadside camera.

26. An apparatus for matching keypoints between images, the apparatus comprising:

at least one memory; and at least one processor coupled to the at least one memory and configured to:

receive transformed first descriptors of first keypoints of a first image, wherein the first image is captured from a first viewing angle, wherein the transformed first descriptors describe the first keypoints as if captured from a third viewing angle;

obtain second descriptors of second keypoints of a second image captured from a second viewing angle; and identify matching keypoints from among the second keypoints that match the first keypoints based on the second descriptors and the transformed first descriptors.

27. The apparatus of claim 26, wherein the at least one processor is further configured to determine a relative pose between the first viewing angle and the second viewing angle based on the first keypoints and the second keypoints.

28. The apparatus of claim 26, wherein the at least one processor is further configured to:

receive a plurality of transformed descriptors including the transformed first descriptors; and compare each transformed descriptor of the plurality of transformed descriptors to the second descriptors to identify the transformed first descriptors from among the plurality of transformed descriptors.

* * * * *